United States Patent
Mathias et al.

(10) Patent No.: US 10,878,808 B1
(45) Date of Patent: Dec. 29, 2020

(54) SPEECH PROCESSING DIALOG MANAGEMENT

(71) Applicant: Amazon Technologies, Inc., Seattle, WA (US)

(72) Inventors: Lambert Leo Mathias, Seattle, WA (US); Bala Murali Krishna Ummaneni, Bellevue, WA (US); Ryan Scott Aldrich, Seattle, WA (US); Diamond Bishop, Seattle, WA (US); Ruhi Sarikaya, Redmond, WA (US); Chetan Nagaraj Naik, Bellevue, WA (US)

(73) Assignee: Amazon Technologies, Inc.

( * ) Notice: Subject to any disclaimer, the term of this patent is extended or adjusted under 35 U.S.C. 154(b) by 158 days.

(21) Appl. No.: 15/934,199

(22) Filed: Mar. 23, 2018

Related U.S. Application Data

(60) Provisional application No. 62/615,111, filed on Jan. 9, 2018.

(51) Int. Cl.
*G10L 15/22* (2006.01)
*G06F 16/9032* (2019.01)
(Continued)

(52) U.S. Cl.
CPC .... *G10L 15/1815* (2013.01); *G06F 16/90332* (2019.01); *G06F 40/295* (2020.01);
(Continued)

(58) Field of Classification Search
CPC . G10L 15/22; G06F 17/2785; G06F 16/90332
See application file for complete search history.

(56) References Cited

U.S. PATENT DOCUMENTS

| | | | |
|---|---|---|---|
| 2014/0079195 A1* | 3/2014 | Srivastava | G06F 17/21 379/88.01 |
| 2014/0278379 A1* | 9/2014 | Coccaro | G10L 15/1822 704/202 |

(Continued)

OTHER PUBLICATIONS

Byron et al., What's a Reference Resolution Module to do? Redefining the Role of Reference in Language Understanding Systems. In Proc. DAARC, 2002.

(Continued)

*Primary Examiner* — Bryan S Blankenagel
(74) *Attorney, Agent, or Firm* — Pierce Atwood LLP

(57) ABSTRACT

A system for processing user utterances and/or text based queries that tracks entities and other context data of a current dialog between the system and the user and can fill slots for new intents of the dialog by performing statistical processing on previously mentioned entities with respect to current slots to be filled. The system may compare a previously mentioned entity to a current slot to be filled using vector representations, such as word embeddings, of the current utterance, dialog history, current intent, name of an entity under consideration, category of the current slot to be filled, distance between the current dialog turn and the dialog turn that mentioned the entity, and other considerations. The individual vectors may be weighted according to an attention operation and processed by a trained decoder to output a score indicating whether the entity in consideration is relevant to the particular slot. In this manner, slots may be filled using entities from previous dialog turns, thus performing statistical anaphora resolution and leading to improved system performance.

22 Claims, 10 Drawing Sheets

(51) Int. Cl.
　　　G10L 15/18　　　(2013.01)
　　　G06F 40/30　　　(2020.01)
　　　G06F 40/295　　 (2020.01)
(52) U.S. Cl.
　　　CPC .............. *G06F 40/30* (2020.01); *G10L 15/22* (2013.01); *G10L 2015/223* (2013.01)

(56) References Cited

U.S. PATENT DOCUMENTS

| | | | | |
|---|---|---|---|---|
| 2014/0309990 | A1* | 10/2014 | Gandrabur | G10L 15/1815 704/9 |
| 2015/0032443 | A1* | 1/2015 | Karov | G06F 16/36 704/9 |
| 2015/0066479 | A1* | 3/2015 | Pasupalak | G06F 17/27 704/9 |
| 2016/0163311 | A1* | 6/2016 | Crook | G06F 40/30 704/275 |
| 2017/0364520 | A1* | 12/2017 | Venkataraman | G06F 17/212 |
| 2018/0150607 | A1* | 5/2018 | MacLeod | G16H 10/20 |
| 2018/0232376 | A1* | 8/2018 | Zhu | G06F 40/35 |
| 2018/0233139 | A1* | 8/2018 | Finkelstein | A61B 5/0507 |
| 2018/0315427 | A1* | 11/2018 | Kwon | G10L 15/22 |
| 2018/0365228 | A1* | 12/2018 | Galitsky | G06F 40/205 |
| 2019/0034780 | A1* | 1/2019 | Marin | G06F 16/3329 |
| 2019/0066668 | A1* | 2/2019 | Lin | G01L 15/22 |
| 2019/0087529 | A1* | 3/2019 | Steingrimsson | G06F 17/5086 |
| 2019/0103107 | A1* | 4/2019 | Cohen | G06F 17/279 |
| 2019/0115027 | A1* | 4/2019 | Shah | G10L 15/30 |
| 2019/0156206 | A1* | 5/2019 | Graham | G06N 3/0454 |
| 2019/0156210 | A1* | 5/2019 | He | G06N 3/082 |
| 2019/0188590 | A1* | 6/2019 | Wu | G06F 17/2785 |
| 2019/0213999 | A1* | 7/2019 | Grupen | G06F 3/167 |
| 2019/0228070 | A1* | 7/2019 | Lu | G06N 3/08 |
| 2020/0143247 | A1* | 5/2020 | Jonnalagadda | G06N 3/0454 |

OTHER PUBLICATIONS

Culotta et al., First-order Probabilistic Models for Conference Resolution. In HLT-NAACL pp. 81-88.

Durrett et al., Easy Victories and Uphill Battles in Conference Resolution. In EMNLP pp. 1971-1982.

Eckert et al., Resolving Discourse Deictic Anaphora in Dialogues. In Proceedings of the Ninth Conference on European Chapter of the Association for Computational Linguistics. Association for Computational Linguistics, pp. 37-44, 1999.

Henderson et al., Deep Neural Network Approach for the Dialog State Tracking Challenge. In SIGDIAL Conference, 2013.

Hochreiter et al., Long Short-Term Memory. Neural Computation 9(8): 1735-1780, 1997.

Hori et al., Dialog State Tracking with Attention-Based Sequence-to-Sequence Learning. In Spoken Language Technology Workshop (SLT), IEEE, pp. 552-558, 2016.

Kingma et al., Adam: A Method for Stochastic Optimization. CoRR abs/112.6980, 2014.

Mensil et al., Investigation of Recurrent-Neural-Network Architectures and Learning Methods for Spoken Language Understanding. In INTERSPEECH, 2013.

Pennington et al., Glove: Global Vectors for Word Representation. In EMNLP, 2014.

Raffel et al., Feed-Forward Networks With Attention Can Solve Some Long-Term Memory Problems. CoRR abs/1512.08756, 2015.

Rao et al., Dialogue Focus Tracking for Zero Pronoun Resolution. In HLT-NAACL. pp. 494-503, 2015.

Stent et al., Interaction Between Dialog Structure and Coreference Resolution. In SLT, 2010.

Stoyanov et al., Easy-First-Conference Resolution. In COLING. pp. 2519-2534, 2012.

Strube et al., A Machine Learning Approach to Pronoun Resolution in Spoken Dialogue. In Proceedings of the 41st Annual Meeting on Association for Computational Linguistics, pp. 168-175, 2003.

Wellner et al., Towards Conditional Models of Identity Unvertainty With Application to Proper Noun Coreference. In IJCAI Workshop on Information Integration and the Web. 2003.

Williams et al. The Dialog State Tracking Challenge. In SIGDIAL Conference, 2013.

Wiseman et al., Learning Anaphoricity and Antecedent Ranking Features for Coreference Resolution. Association for Computational Linguistics. 2015.

Conneau et al., Word Translation Without Parallel Data. In HLT-NAACL, pp. 81-88, 2017.

Henderson et al., Robust Dialog State Tracking Using Delexicalised Recurrent Neural Networks and Unsupervised Adaptation. In Spoken Language Technology Workshop (SLT), 2014 IEEE, pp. 360-364.

Kumar et al., Just ASK: Building an Architecture for Extensible Self-Service Spoken Language Understanding. CoRR abs/1711.00549. http://arxiv.org/abs/1711.00549. 2017.

Lefevre et al., Cross-Lingual Spoken Language Understanding from Unaligned Data Using Discriminative Classification Models and Machine Translation. In Eleventh Annual Conference of the International Speech Communication Association. 2010.

Schulz et al., A Frame Tracking Model for Memore-Enhanced Dialogue Systems. In ACL REPL4NLP, 2017.

* cited by examiner

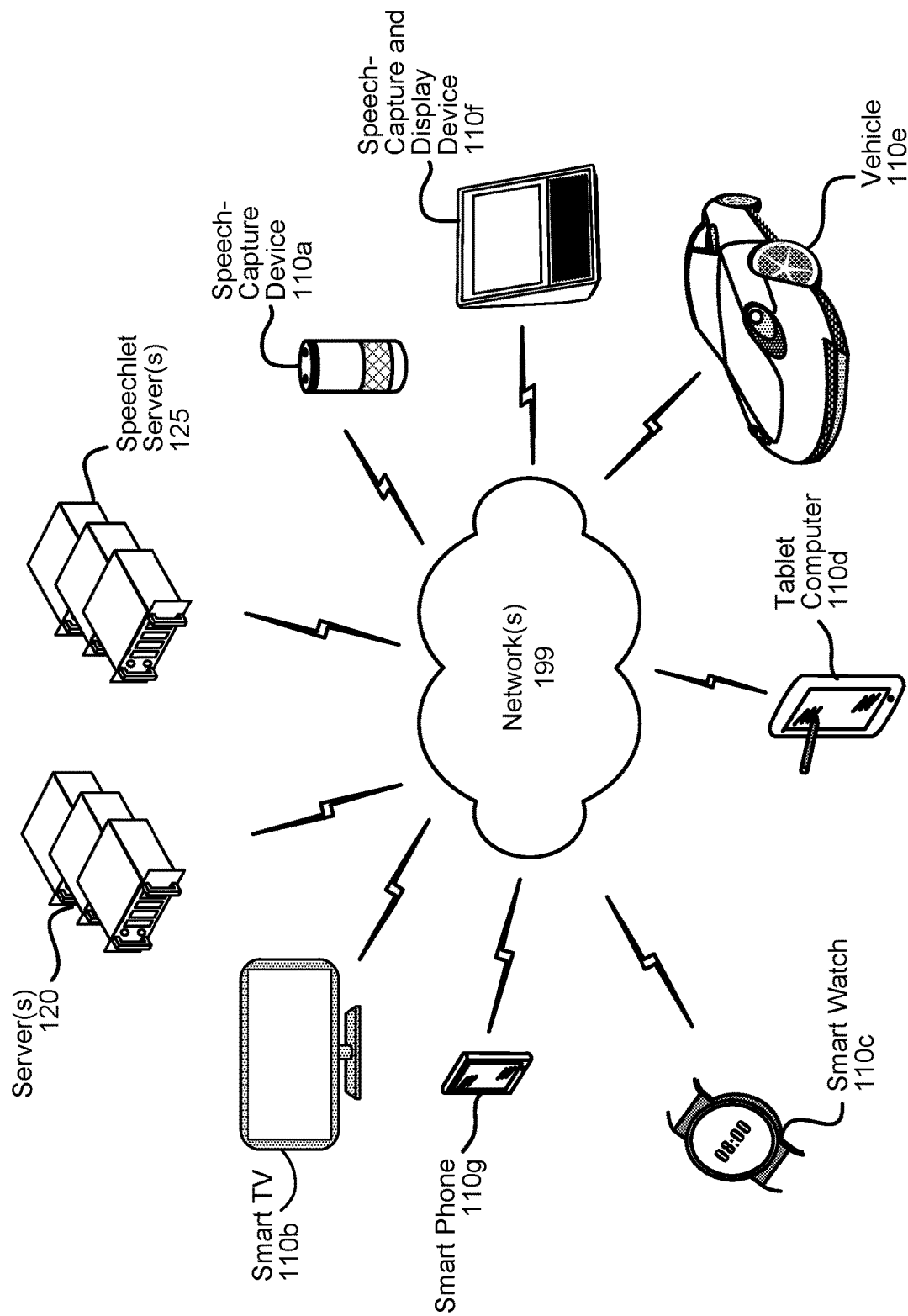

SPEECH PROCESSING DIALOG MANAGEMENT

CROSS-REFERENCE TO RELATED APPLICATIONS

This application claims the benefit of priority to U.S. Provisional Patent Application 62/615,111, filed Jan. 9, 2018, entitled SPEECH PROCESSING DIALOG MANAGEMENT, in the names of Diamond Bishop, et al., the contents of which is expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 10 illustrates an example of a computer network for use with the speech processing system.

DETAILED DESCRIPTION

Figure 1:
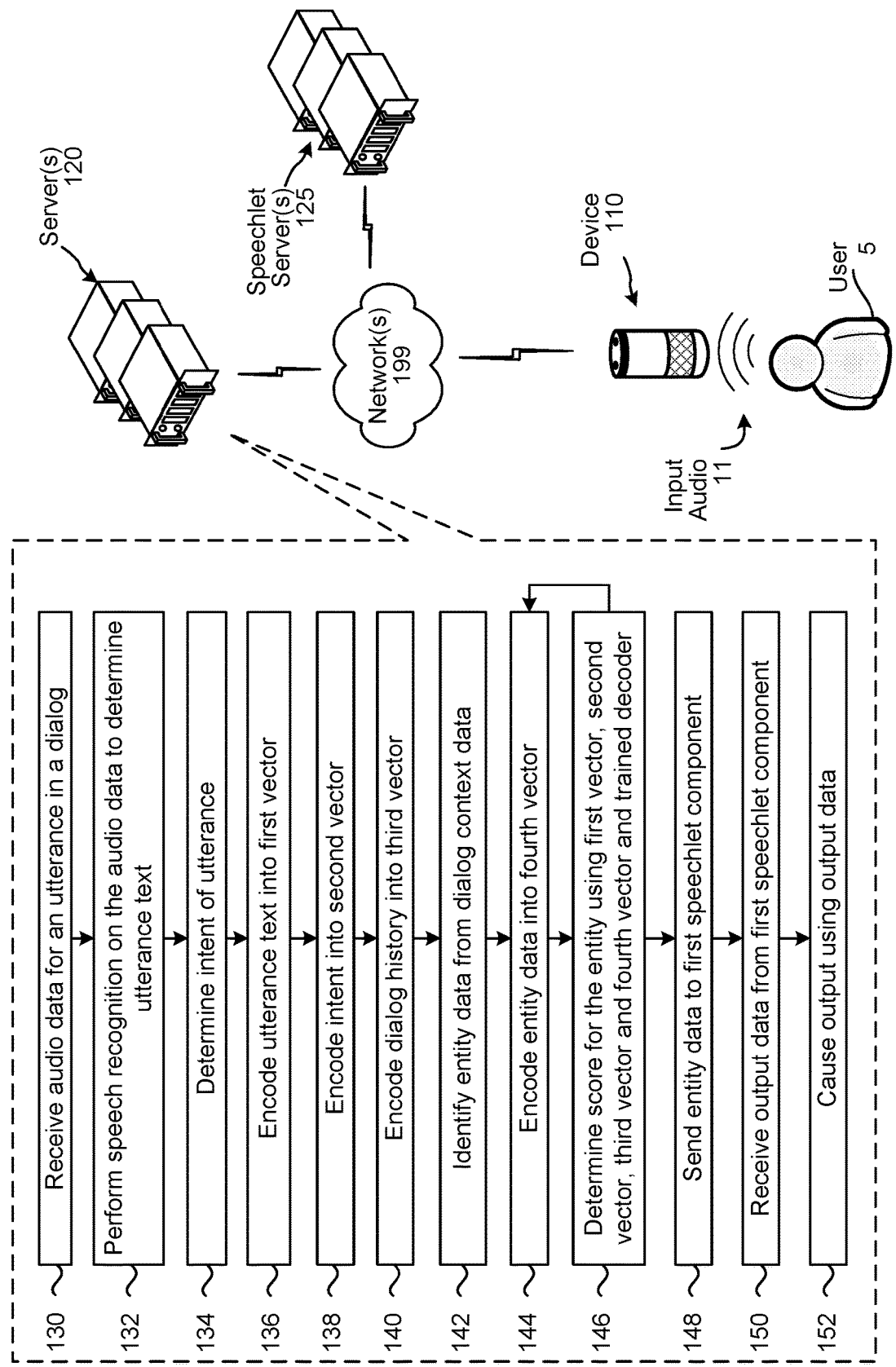
FIG. 1 illustrates a distributed speech processing system according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system. A speech/language processing system, such as that described herein, may also be configured to process textual inputs, such as inputs sent from a mobile device, internet portal, etc. If input comes in the form of text, the system may skip ASR processing, but may generally operate in the same manner. Even if an input comes in the form of text, the system processing the input may still be referred to as a speech processing system or a language processing system.

A speech processing system may answer user commands requesting the output of content. For example, a user may say "Alexa, what is the weather." In response, the system may output weather information. For further example, a user may say "Alexa, play Adele." In response, the system may output music sang by Adele.

A generalized speech processing system may be configured to perform many different actions such as outputting media, controlling home devices, making reservations, ordering products, obtaining reviews, playing games, etc. It is a non-trivial task to configure a system to accurately capture audio data for general utterances, be able to process the audio data (or input text data) to determine the user's intent, identify an appropriate executable action for that intent, and select the appropriate component for handling that action to ultimately correctly execute the user's intent and obtain the desired result.

Certain speech processing systems perform NLU to derive a list of intents that potentially relate to an input user command. An intent corresponds to what the user desires a system to do in response to the utterance. During NLU processing the system processes the text of the user command to determine one or more intents that may correspond to the user utterance. The intent may be represented by a particular action that the system (either alone or in conjunction with other components) can perform. For example, a system may determine an input command of "Play Adele" potentially relates to a <PlayMusic> action and a <PlayVideo> action, since the command may correspond to a request to play Adele music or a request to play an Adele music video.

Speech processing can be computationally expensive. That is, significant computing resources may be needed to process ASR, NLU, and command execution within a reasonable time frame. Because of this, a distributed computing environment may be used when performing speech processing. A typical distributed environment may involve a local device having one or more microphones configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

In certain speech processing systems, the device local to the user may be relatively limited in its capabilities. For example, certain devices may include a microphone array, loudspeaker, volume controls, wireless communication components, and little else. The functionality of these limited devices with regard to processing and executing spoken commands may be almost exclusively controlled by remote system components.

An interaction between a user and a speech processing system may be referred to as a dialog. A dialog is an exchange between the user and the system where the user speaks a command and the system executes it. While many dialogs involve a single utterance, many dialogs may involve many different utterances to ultimately execute the action called for by the user. For example, a dialog may involve one or more user utterances, such as queries associated with a particular task (e.g., one or more user utterances and optional system responses during which a user requests information or gives a command, and the speech processing system executes the command, requests more information, or provides the requested information). The dialog may also involve unrelated tasks across multiple utterances during a conversation or exchange with the system. For example as part of a dialog a user may ask the system to play music from an artist, ask questions about the artist, ask about an upcoming concert for the artist, ask for calendar information about the date of the concert, etc. In order to properly process a multiple-utterance dialog (or other exchange with the system), a system may track various information between exchanges within a dialog.

While interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the system may expect the system to provide the hours (or the closing time) of the Starbucks that was just part of an exchange between the user and the system. In another example, after asking the system to "play Piano Man by Billy Joel" the user may ask the system "when did he write that?" In order to answer the second query, the system must understand that "he" refers to Billy Joel and "that" refers to the song Piano Man. Words that refer to an entity but do not explicitly name the entity are an example of anaphora, namely a word referring to or replacing another word. Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, anaphora may come in the form of words to substitute for other words (e.g., pronouns), as well as phrasing of anaphora without a specific word to represent the anaphora (referred to as zero-phrase anaphora), and other forms of reference. The present system may be used to resolve many such forms of anaphora.

The speech processing system may receive and/or store contextual information related to a dialog or conversation. This contextual information may be used to resolve anaphora within a given conversation. The contextual information may include a list of entities referred to during the dialog, events that have recently taken place that may be relevant to the dialog, or other information. The contextual information may be used later in the conversation to resolve anaphora. In one example, if a user first asks the system to "Book a flight to Chicago," and later says "When is the next flight there?" the contextual information related to the conversation may be used to help determine that "there" refers to "Chicago."

The response generator may additionally receive and/or store contextual information and location information related to the environment in which the dialog is taking place. For example, the contextual information and location information can reference media content being played and/or displayed to the user by the client device at the time the user initiates the dialog with the client device. This information may be used to resolve exophora in a given conversation. For example, a user may be watching a film (on either a same or different device from the device that captures the user's utterance). The user may query, "Who is that?" or "What does that mean?" while watching the film. The system may receive contextual information and location information related to the user's environment. In this case, the contextual information and location information may relate to the currently playing film. The location information may include, e.g., playback location information, such as the current timepoint of the media content, the current location or scene, etc. The contextual information may include, e.g., characters, locations, specific words, or objects mentioned in the scene, etc.

While certain anaphora resolution may be based on explicit linguistic processing (for example, searching for previously mentioned male individuals when attempting to resolve an anaphoric reference of "he"), linguistic processing may not always suitably resolve an anaphoric reference, and sometimes may yield undesired results (for example if a user asks "what is his name" when asking the system to identify a female, or vice-versa). Further, explicit linguistic processing may have difficulty resolving zero-phrase anaphora or otherwise understanding the context of a dialog in a way that results in desired system performance.

Further, linguistic processing may require the system to maintain an updated catalog of entities with descriptions and categories that can span across multiple applications (referred to below as speechlets or speechlet components). For example, if a user asks the system to obtain the weather in "Seattle," and then ask "when is the next flight there?" the system must be able to understand that for weather purposes "Seattle" can be a "WeatherLocation" and for flight purposes "Seattle" can be a "DestinationCity" as a weather speechlet may have different entity categories than a flight booking speechlet. While the system may maintain such a catalog of entities, it can be technically challenging to track how each entity can be operated on by each speechlet, particularly when new entities are regularly appearing and the system is capable of interacting with thousands of speechlets.

Offered is a system that can fill slots for a particular utterance (e.g., determine a "DestinationCity" for a travel speechlet, determine a "WeatherLocation" for a weather speechlet, etc.) by using a statistical analysis of previously mentioned entities of a dialog (and other contextual information). The statistical analysis avoids explicit linguistic/semantic processing for each anaphoric reference and allows the system to improve anaphoric resolution, particularly in the case of a dialog that invokes multiple speechlets.

FIG. 1 illustrates a system for improved processing of entity resolution using statistical approaches according to embodiments of the present disclosure. Although the figures and discussion illustrate certain operational steps of the system in a particular order, the steps described may be performed in a different order (as well as certain steps removed or added) without departing from the intent of the disclosure. A device 110 local to a user 5, one or more server(s) 120, and one or more speechlet servers 125 may communicate across one or more networks 199. The speechlet server(s) 125 may each correspond to a particular speechlet 290 (described below) and may be capable of performing operations to ultimately execute an action.

During a runtime operation (such as when a user utterance/command is received by the system), a device 110 may detect input audio 11 corresponding to a spoken utterance originating from the user 5. The device 110 generates input audio data 211 corresponding to the input audio 11 and sends the input audio data 211 to the server(s) 120. The server(s) 120 receives the input audio data 211 from the device 110 and performs speech processing (such as ASR and NLU) on the input audio data to determine text data.

As shown in FIG. 1, the system may receive (130) audio data for an utterance in a dialog. The system may then perform (132) speech recognition on the audio data to determine utterance text. Alternatively, a device may receive input from the user 5 corresponding to text or a button press via a touch screen providing a virtual keyboard. The device may generate input text data corresponding to the input text. The device may send the input text data to the server(s) 120 via an application operating on the device and in communication with the server(s) 120. The system may determine (134) an intent of the utterance. The system may do so by performing NLU operations, such as those described herein, on the utterance text. The system may then determine a number of different vector representations (e.g., vector data) corresponding to different aspects of the dialog. For example, the system may then encode (136) the utterance text into a first vector, encode (138) the intent into a second vector, and encode (140) the dialog history into a third vector. Various different encoders and operations related thereto are discussed below in reference to FIG. 5.

The system may also have stored dialog context data corresponding to the dialog. As part of that dialog context data the system may have a record of different entities that are relevant to the dialog, such as entities mentioned in previous utterances of the dialog, entities related to actions taken within a certain time window of the dialog, etc. The system may identify (142) entity data from the dialog context data. The entity data may include text corresponding to a name of an entity as well as a category of the entity, where the category corresponds to the speechlet that originated the entity into the dialog. For example, if the user asked the system "what is the nearest diner?" and the system invoked a local search speechlet which returned data of <TheTownDiner>, that name may be stored as an entity along with a category, such as <restaurantname>, where the category may correspond to the returning speechlet (in this case the local search speechlet). The system may encode (144) the entity data (e.g., the text of the entity name and category) into a fourth vector. The system may then determine (146) a score for the entity using the first vector, second vector, third vector, fourth vector and trained decoder where the trained decoder is configured to output a score that indicates how relevant the particular entity is for a particular slot of the intent of the current utterance (e.g., the utterance of the utterance text determined in step 132).

The system may then repeat steps 144 and 146 for a number of different entities identified in the dialog context data as well as for any entities mentioned in the current utterance (e.g., determined from the utterance text). The system may also repeat step 146 for each entity for each potential slot to be filled related to the current intent (e.g., the intent determined in step 134). Thus, if the current intent requires multiple data points (slots) to operate, the system may determine a score for each entity for each slot. For example, if the user engages in a dialog with the system asking about potential travel to a remote city and then asks "what's the weather supposed to be there?", the system may determine (134) that the current utterances is asking for a <GetWeather> intent and that in order to execute that intent the weather speechlet requires data for a <weathercity> slot and <date> slot. The system may have a number of entities in the dialog data. For each (or a subset of) the entities in the dialog data slot, the system may perform steps 144 and 146 for each slot and select from among the top scores, the data to be sent to the weather speechlet to fill the <weathercity> and <date> slots. Thus the system may send (148) entity data to a first speechlet component, receive (150) output data from the first speechlet component (e.g., weather data), and cause (152) an output using the output data (e.g., synthesize an audio output of the weather data and send the resulting audio data to the device 110 for output).

Figure 2:
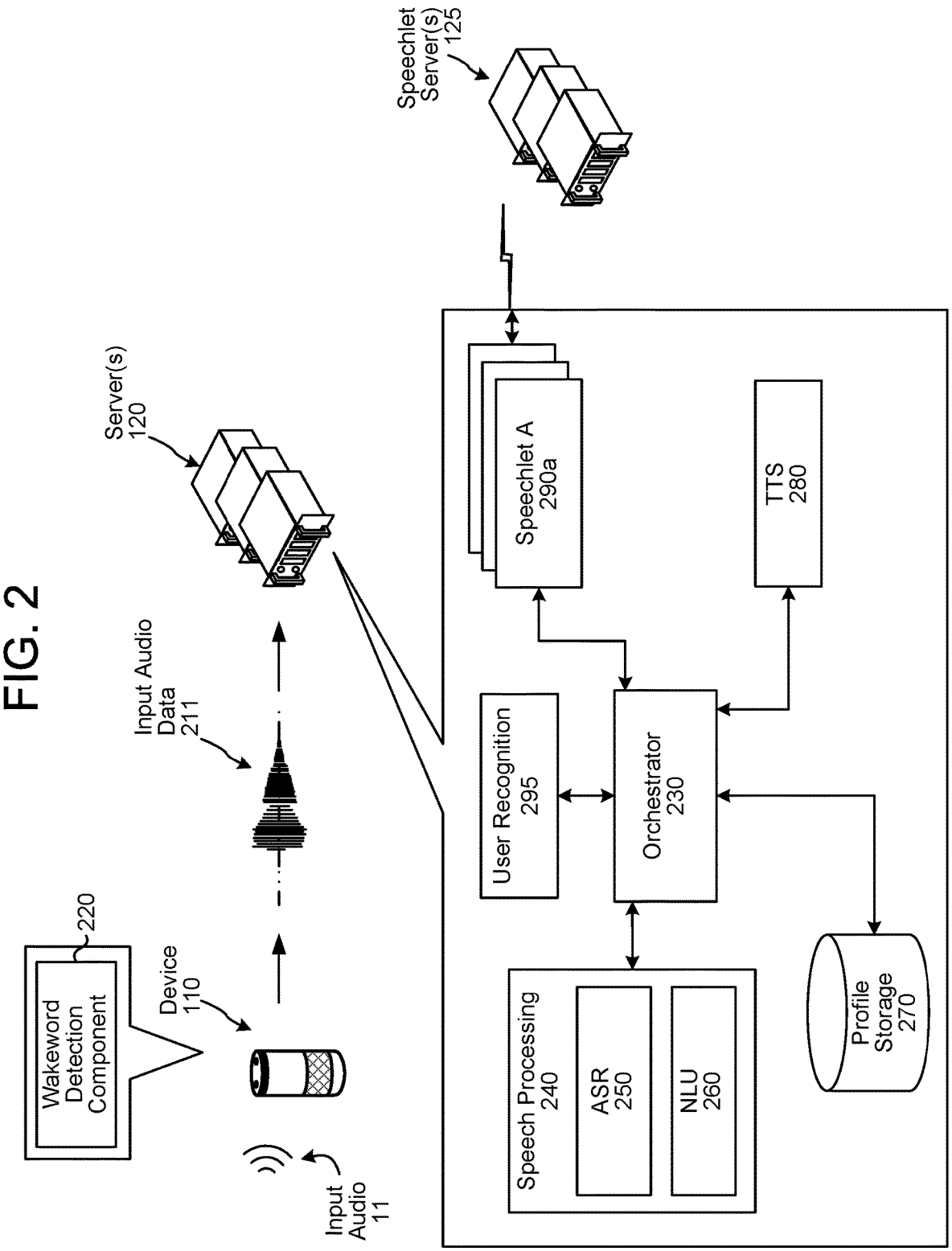
FIG. 2 is a conceptual diagram of components of a system according to embodiments of the present disclosure.

The system may operate using various components as described in FIG. 2. The various components may be located on a same or different physical devices. Communication between various components may occur directly or across a network(s) 199.

A speech-capture device 110 (e.g., a device that is capable of detecting a user's speech and converting the audio 11 of the speech into audio data 211) may receive input audio 11, corresponding to a spoken utterance corresponding at least in part to a command, using an audio capture component, such as a microphone or array of microphones. The device 110, using a wakeword detection component 220, processes input audio data corresponding to the input audio 11 to determine if a keyword (e.g., a wakeword) is detected in the input audio data. Following detection of a wakeword, the device 110 sends input audio data 211, corresponding to the utterance, to the server(s) 120.

Upon receipt by the server(s) 120, the input audio data 211 may be sent to an orchestrator component 230. The orchestrator component 230 may include memory and logic that enables the orchestrator component 230 to transmit various pieces and forms of data to various components of the system.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The ASR component 250 interprets the utterance in the input audio data 211 based on a similarity between the utterance and pre-established language models. For example, the ASR component 250 may compare the input audio data 211 with models for sounds (e.g., subword units, such as phonemes, etc.) and sequences of sounds to identify words that match the sequence of sounds spoken in the utterance represented in the input audio data 211. The ASR component 250 sends (either directly or via the orchestrator component 230) the input text data generated thereby to an NLU component 260 of the speech processing component 240. The input text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The orchestrator 230 (or other component) may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering speechlet and may prompt the user several times for several utterances to obtain the data from the user needed to complete the pizza order (e.g., toppings, time of delivery, any additional items to order, etc.). Another example may be the user invoking a quiz game speechlet, where multiple questions are asked of the user and the user responds with utterances that are processed by the system and whose text data is sent to the quiz show speechlet. Each utterance of the dialog may have a unique utterance ID but may also share a common dialog ID so that the system can process incoming audio data knowing that it is associated with a particular dialog.

Alternatively, a device (such as a mobile device) may send input text data to the server(s) 120. Upon receipt by the server(s) 120, the input text data may be sent to the orchestrator component 230. The orchestrator component 230 may send the input text data to the NLU component 260 for processing as if the input text data came from the ASR component 250.

The NLU component 260 attempts to make a semantic interpretation of the phrases or statements represented in the input text data input therein. That is, the NLU component 260 (as described in detail herein) determines one or more meanings associated with the phrases or statements represented in the input text data based on individual words represented in the input text data. The NLU component 260 determines an intent (e.g., an action that a user desires be performed) of a command represented in the input text data as well as pertinent pieces of information in the input text data that allow a device (e.g., the device 110, the server(s) 120, the speechlet server(s) 125, etc.) to execute the intent. For example, if the input text data corresponds to "call mom," the NLU component 260 may determine a user intended to activate a telephone in his/her device and to initiate a call with a contact matching the entity "mom."

When audio data of an utterance is received, ASR is performed to determine text corresponding to the audio data and NLU is performed to determine what intent/action is intended by the utterance. Depending on the NLU output data, an instruction is sent to a speechlet component or skill component for handling the action called for in the utterance.

A "speechlet" component may include software running on the server(s) 120 that is akin to an application. That is, a speechlet 290 may enable the server(s) 120 to execute specific functionality in order to provide data or produce some other output requested by a user. The server(s) 120 may be configured with more than one speechlet 290. For example, a weather service speechlet may enable the server(s) 120 to provide weather information, a car service speechlet may enable the server(s) 120 to book a trip with respect to a taxi or ride sharing service, an order pizza speechlet may enable the server(s) 120 to order a pizza with respect to a restaurant's online ordering system, etc. A speechlet component may include hardware, software, firmware, or the like that may be dedicated to the particular speechlet or shared among different components. The speechlet component may be part of the server(s) 120 (for example as speechlet 290) or may be located at whole (or in part) with separate speechlet server(s) 125. Speechlet server(s) 125 may communicate with speechlets 290 within the server(s) 120 and/or directly with the orchestrator 230 or with other components. For present purposes, unless expressly stated otherwise, reference to a speechlet or speechlet component (such as speechlet 290) may include a speechlet component operating within server(s) 120 and/or speechlet operating within speechlet server(s) 125.

A speechlet 290 may be configured to perform one or more actions. An ability to perform such an action may sometimes be referred to as a "skill." That is, a skill may enable a speechlet component to execute specific functionality in order to provide data or produce some other output requested by a user. A particular speechlet component may be configured to execute more than one skill/action. For example, a weather service skill involve a speechlet component providing weather information to the server(s) 120, a car service skill may involve a speechlet component booking a trip with respect to a taxi or ride sharing service, an order pizza skill may involve a speechlet component ordering a pizza with respect to a restaurant's online ordering system, etc.

A speechlet(s) 290 and may be in communication with one or more speechlet servers 125 implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

In some instances, a speechlet(s) 290 or a speechlet server(s) 125 may provide output text data responsive to the present user command. The server(s) 120 may include a text-to-speech (TTS) component 280 that generates output audio data from speechlet(s) 290 and speechlet server(s) 125 provided output text data. The TTS component 280 may use different synthesis techniques. In one method of synthesis called unit selection, the TTS component 280 matches text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder.

The server(s) 120 may include a user recognition component 295. The user recognition component 295 may take as input the input audio data 211 and/or input text data output by the ASR component 250 as well as potential other input data such as video, biometric data, or the like. The user recognition component 295 determines scores indicating whether the command originated from a particular user. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing audio characteristics in the input audio data 211 to stored audio characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform NLU processing as well as processing performed by speechlets 290 and/or speechlet servers 125, routing by an action manager (not shown), or other functions.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may include preference data specific to the user associated therewith. That is, each user profile may include preference data unique from one or more other user profiles encompassed by the same customer profile. The preference data may include information indicating what preferences the user has with regard to certain speechlets or other information. A user profile may be a stand-alone profile or may be encompassed under a customer profile. A user profile may also include history data which may be data representative of previous interactions between the user of the user profile and the system. A user profile may incorporate information associating one device with another. For example, if a user has one speech-capture device (such as an Echo Dot) in the same room as a media playback device (such as a Fire TV), the user may indicate the two devices should be linked, thus allowing the system to more easily recognize spoken media playback commands received by the Echo Dot may be intended to cause media to playback on the Fire TV. Thus the system may store an association between the devices as part of the user's (or other) profile. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199. User profile data may be used to inform NLU processing as well as processing performed by speechlets 290.

Figure 3:
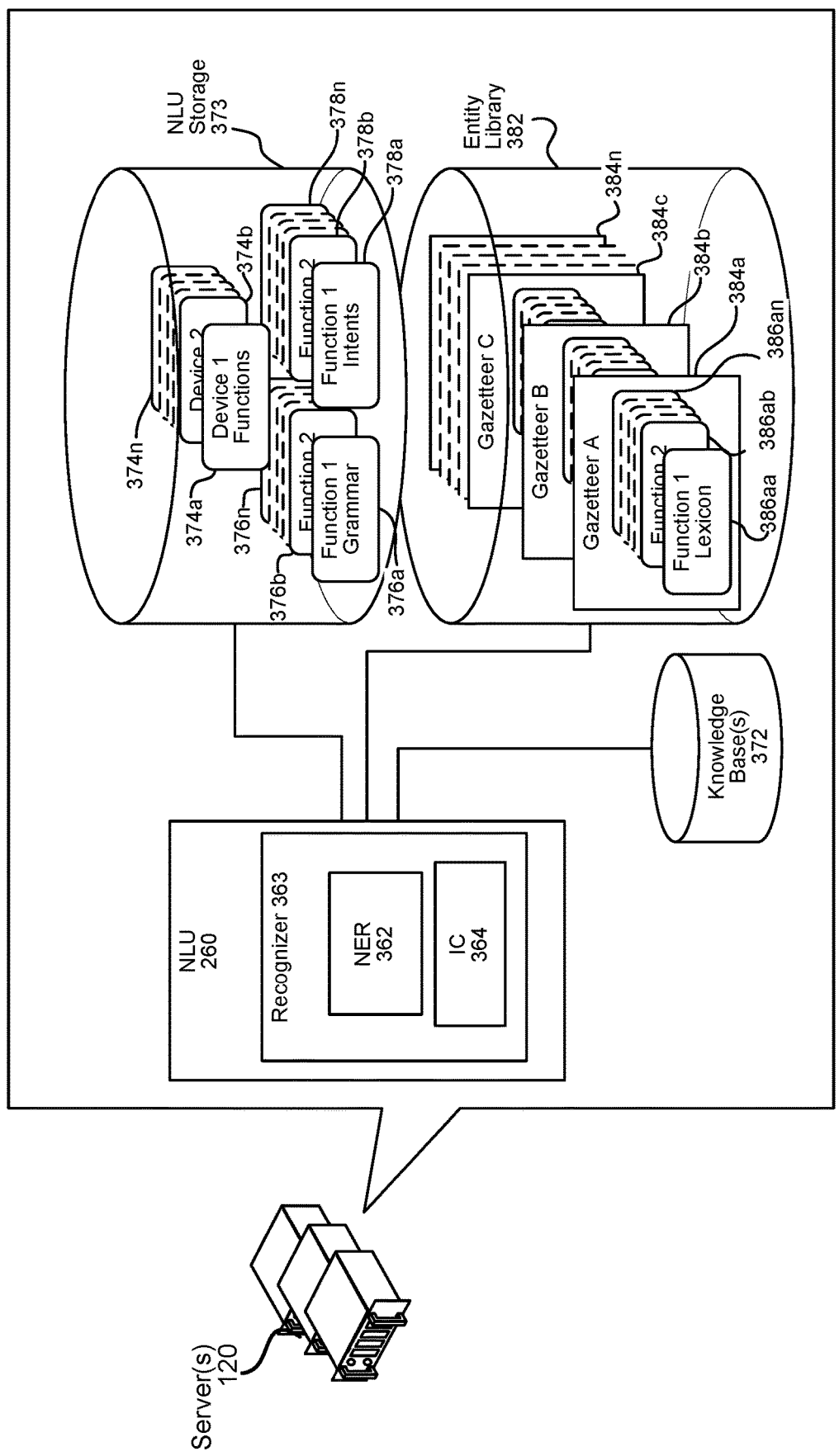
FIG. 3 is a conceptual diagram of how natural language processing is performed according to embodiments of the present disclosure.

FIG. 3 illustrates how NLU processing is performed on input text data. Generally, the NLU component 260 attempts to make a semantic interpretation of text represented in text data. That is, the NLU component 260 determines the meaning behind the text represented in text data based on the individual words. The NLU component 260 interprets text to derive an intent or a desired action of the user as well as the pertinent pieces of information in the text that allow a device (e.g., device 110, server(s) 120, speechlet(s) 290, speechlet server(s) 125) to complete that action.

The NLU component 260 may process text data including several hypotheses of a single utterance. For example, if the ASR component 250 outputs ASR results including an N-best list of hypotheses, the NLU component 260 may process the text data with respect to all (or a portion of) the textual interpretations represented therein.

The NLU component 260 may include one or more recognizers 363. Each recognizer 363 may be associated with a different "function" or "content source" (e.g., a different speechlet 290 or skill). The NLU component 260 may determine a function potentially associated with the command represented in text data input thereto in order to determine the proper recognizer 363 to process the hypothesis. The NLU component 260 may determine a command represented in text data is potentially associated with more than one function. Multiple recognizers 363 may be functionally linked (e.g., a telephony/communications recognizer and a calendaring recognizer may utilize data from the same contact list).

If the NLU component 260 determines a command represented in text data is potentially associated with multiple functions, the recognizers 363 associated with the functions may each process the text data in parallel. For example, if a command potentially implicates both a communications function and a music function, a recognizer associated with the communications function may process the text data in parallel, or substantially in parallel, with a recognizer associated with the music function processing the text data. The output generated by each recognizer may be scored to indicate the respective recognizers confidence in its processing of the text data.

The NLU component 260 may communicate with various storages to determine the potential function(s) associated with a command represented in text data. The NLU component 260 may communicate with an NLU storage 373, which includes databases of devices (374a-374n) identifying functions associated with specific devices. For example, the device 110 may be associated with functions for music, calendaring, contact lists, device-specific communications, etc. In addition, the NLU component 260 may communicate with an entity library 382, which includes database entries about specific services on a specific device, either indexed by device ID, user ID, or group user ID, or some other indicator.

Each recognizer 363 may include a named entity recognition (NER) component 362. The NER component 362 attempts to identify grammars and lexical information that may be used to construe meaning with respect to a command represented in text data input therein. The NER component 362 identifies portions of text represented in text data input into the NLU component 260 that correspond to a named entity that may be recognizable by the system.

Each recognizer 363, and more specifically each NER component 362, may be associated with a particular grammar model and/or database 376, a particular set of intents/actions 378, and a particular personalized lexicon 386. Each gazetteer 384 may include function-indexed lexical information associated with a particular user and/or device. For example, the Gazetteer A (384a) includes function-indexed lexical information 386aa to 386an. A user's music function lexical information might include album titles, artist names, and song names, for example, whereas a user's contact-list lexical information might include the names of contacts. Since every user's music collection and contact list is presumably different, this personalized information improves entity resolution.

An NER component 362 applies grammar models 376 and lexical information 386 associated with the function (associated with the recognizer 363 implementing the NER component 362) to determine a mention one or more entities in text data input thereto. In this manner, the NER component 362 identifies "slots" (i.e., particular words in text data) that may be needed for later command processing. The NER component 362 may also label each slot with a type of varying levels of specificity (e.g., noun, place, city, artist name, song name, etc.).

Each grammar model 376 includes the names of entities (i.e., nouns) commonly found in text about the particular function to which the grammar model 376 relates, whereas the lexical information 386 is personalized to the user(s) and/or the device 110 from which the input audio data 211 or input text data 213 originated. For example, a grammar model 376 associated with a shopping function may include a database of words commonly used when people discuss shopping.

A downstream process called named entity resolution actually links a portion of text to an actual specific entity known to the system. To perform named entity resolution, the NLU component 260 may utilize gazetteer information (384a-384n) stored in an entity library storage 382. The gazetteer information 384 may be used to match text represented in text data with different entities, such as song titles, contact names, etc. Gazetteers may be linked to users (e.g., a particular gazetteer may be associated with a specific user's music collection), may be linked to certain function categories (e.g., shopping, music, video, communications, etc.), or may be organized in a variety of other ways.

Each recognizer 363 may also include an intent classification (IC) component 364. The IC component 364 parses an text data to determine an intent(s) of the function associated with the recognizer 363 that potentially corresponds to the text data. An intent corresponds to an action to be performed that is responsive to the command represented by the text data. The IC component 364 may communicate with a database 378 of words linked to intents. For example, a music intent database may link words and phrases such as "quiet," "volume off," and "mute" to a "mute" intent. The IC component 364 identifies potential intents by comparing words in the text data to the words and phrases in an intents database 378 associated with the function that is associated with the recognizer 363 implementing the IC component 364.

The intents identifiable by a specific IC component 364 are linked to function-specific (i.e., the function associated with the recognizer 363 implementing the IC component 364) grammar frameworks 376 with "slots" to be filled. Each slot of a grammar framework 376 corresponds to a portion of the text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the function associated with the recognizer 363 implementing the NER component 362, attempting to match words and phrases in the text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music function recognizer 363 may parse and tag text corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music function, which an IC component 364 (also implemented by the music function recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search the database of generic words associated with the function (in the knowledge base 372). For example, if the text data including text corresponding to "play songs by the rolling stones," after failing to determine an album name or song name called "songs" by "the rolling stones," the NER component 362 may search the function's vocabulary for the word "songs." In the alternative, generic words may be checked before the gazetteer information, or both may be tried, potentially producing two different results.

The NLU component 260 may tag text to attribute meaning to the text. For example, the NLU component 260 may tag "play mother's little helper by the rolling stones" as: {intent} <PlayMusic>, {artist name} rolling stones, {media type} SONG, and {song title} mother's little helper. For further example, the NLU component 260 may tag "play songs by the rolling stones" as: {intent}<PlayMusic>, {artist name} rolling stones, and {media type} SONG.

The orchestrator 230 (or other component) may also include a context aggregator component. The context aggregator component receives context data 408 (shown in FIG. 4) from various contextual sources. The context data may include time data, which represents a time of receipt of the input audio 11 by the device 110, a time or receipt of input data by the server(s) 120, ID of the user of the utterance, device ID of the device 110, whether other devices are linked to the device 110, dialog ID 432, and/or other information. The context aggregator component may aggregate the context data and put the context data in a form that can be processed by various system processing components such as the NLU, etc. Context data 408 may include data obtained from the device 110 or from other services connected to the server(s) 120 such as speechlet components 290/125.

The context data 408 may include speechlet availability data 472. Such information may indicate what speechlets are available and authorized to process the incoming utterance. For example, if the user has indicated that only certain speechlets should handle utterances for the user, the selected speechlets may be noted in the speechlet availability data.

The context data 408 may also include device data 474. Device data may indicate characteristics of the device 110 from which the original input command data was received. For example, such data may include information such as display capabilities of the device, a quality of one or more speakers of the device, a device type, etc. Device data may also represent a speechlet with which the device 110 is associated. The device data may also indicate whether the device 110 is currently streaming data or was streaming data when the original command data was received and sent to the server(s) 120. Device data 474 may also include an indicator of what data is currently being displayed or used on a device. Such information may be used to disambiguate anaphora such as (play song three) where the system can list the song choices being displayed by a device in the dialog candidate list.

The context data 408 may also include user profile data 470. The user profile data may represent preferences and/or characteristics of the user that originated the current command. Such data may be received from the profile storage 270. The user profile data 470 may also track events related to devices associated with a same user profile (for example, smart devices such as light switches, etc. in a home) associated with a device 110. Such user profile data 470 may be used to populate event information in a dialog candidate list 420 for purposes of use by the dialog tracker 590.

The context data 408 may also include location data. The location data may represent a location of the device 110 from which the original input command data was received.

The context data 408 may also include data regarding whether one or more speechlets are "in focus." A speechlet may be in interactive focus, meaning the speechlet was the most recent speechlet that executed a command for a user or device associated with a present command and/or the speechlet may be involved with an open dialog (e.g., series of utterances and responses) with a user device. Interactive focus attempts to continue a conversation between a user and the system and/or a speechlet for purposes of processing the dialog. However, there may be instances where a user inputs a command that may be handled by a speechlet that is currently in interactive focus, but which the user does not intend to be executed by such speechlet. The system may process the context data 408 and other data to determine how best to process a command when one or more speechlets may be in focus.

A speechlet may alternatively be in content focus, meaning the speechlet is associated with content that is streaming to the user and/or device associated with a current command when the current command is received by the system. For example, a previous command of "Play music" may result in the system streaming music to a device from a specific music speechlet. While the speechlet is streaming the music, the same user may input a second command. Since the second command was received when the music speechlet was streaming the music, the system may query that music speechlet in the first instance, even if the second command is not necessarily intended for the music speechlet. The music speechlet may be configured to attempt to execute the subsequent command (and potentially output an error) even though the user may have intended another speechlet to execute such command.

The context data 408 may also include dialog data 430. A "dialog" or "dialog session" as used herein may refer to data transmissions (such as relating to multiple utterances) between the server(s) 120 and a local device (e.g., the device 110) that all relate to a single originating command. Thus, the data transmissions of a dialog session may share a dialog ID or other unique identifier that may be used by an orchestrator component 230, speechlet(s) 290, speechlet server(s) 125, etc. to track information across the dialog session. For example, the device 110 may send the server(s) 120 input data corresponding to "Alexa, play jeopardy." The server(s) 120 may send output data corresponding to a jeopardy statement to the device 110 for output to a user(s). A user may then respond to the statement, which the device 110 sends as input data to the server(s) 120. The sending of input data from the device 110 to the server(s) 120 and the sending of output data from the server(s) 120 to the device 110 may all correspond to a single dialog session related to the originating command "play jeopardy." In some examples, a dialog-initiating utterance may start with a wakeword and end with a command, such as "Alexa, play jeopardy," where "Alexa" is the wakeword and "play jeopardy" is the command. Subsequent utterances of the same dialog session may or may not start with speaking of a wakeword. Each utterance of a dialog may be associated with a unique utterance ID 434 such that multiple utterance IDs may be associated with a single dialog session ID 432.

Dialog data 430 may include interactive focus information, (i.e., representing which speechlet was most recently called to execute a previous command for the user and/or device 110 associated with the present command). Dialog data 430 may also include content focus information (i.e., representing a speechlet that is streaming data to the device 110 when the input data corresponding to the current command is received by the server(s) 120). The context data 408 may be one portion of the data used to determine which speechlet should execute the current command. Thus, unlike certain systems that use interactive focus and content focus as binary determinations regarding which speechlet should execute a current command, the presently disclosed architecture considers focus along with other data, thereby minimizing disproportionate routing.

The dialog data 430 may also include the dialog candidate list 420. The dialog candidate list 420 may include entity data corresponding to individual entities that are included as part of the dialog. For example, if an input utterance mentions an entity, data about that entity may be stored in the dialog candidate list. Further, if output data corresponding to an input utterance (e.g., the system's response to a user query) involves an entity, data about that entity may be stored in the dialog candidate list. The dialog candidate list 420 may include only information regarding entities for a particular ongoing dialog or the dialog candidate list 420 may include data from previous dialogs. The entries in the dialog candidate list 420 may be used for purposes of slot-filling for incoming utterances, such as those that include anaphora or similar unstated references. Each entity 412 may include text data corresponding to the name of the entity, sometimes referred to as a token or a value (e.g., "Barack Obama"). Each entity 412 may also include text data corresponding to the category of the entity, sometimes referred to as a key (e.g., <person>). The particular category/key may correspond to the speechlet (or NLU ontology) that output the entity. For example, the value "Seattle" may be associated with the key <city> if it originated from a local search speechlet, but it may be associated with the key <weatherlocation> if it originated from a weather speechlet. The different entity key-value pairs (e.g., [Barack Obama, <person>], [Seattle, <weatherlocation>] for a dialog may be stored in the dialog candidate list 420. The entities in the dialog candidate list 420 may also include other entities that correspond to data corresponding to the dialog such as weather information (e.g., "50 degrees F.,"), time information (e.g., "4:32 pm"), etc. If a current utterance includes an entity (as determined by the NLU component 260 or otherwise) the entity may be added to the dialog candidate list 420. Thus the dialog candidate list 420 may include entities in the current utterance, as well as entities from previous utterances of the dialog. In this manner entities in a current utterances may be scored in a similar manner to entities of previous utterances as described below in reference to FIG. 5.

The dialog candidate list 420 may also include information taken from other context data 408 even if not formally mentioned during a user input or system response during the dialog. This may enable the system to respond to events even if not explicitly mentioned in the dialog. For example, if a timer at a user's home is scheduled to turn off a light at a certain time, and that time is reached, the system may turn off the light and record in the context data 408 (e.g., in the dialog candidate list 420) an indication that the light was turned off. If the user then speaks an utterance "turn those back on," the system may perform processing (such as that explained below) on the key-value pair corresponding to the light being turned off, to enable the system to determine what entity (in this case the recently switched off light) corresponds to what should be turned back on. Other such contextual events may be stored in the context data 408 and operated on by the system. For example, if the system detects that a door bell has been rung, the system may note that in the context data 408 such that if a user then asks the system "who's there?" the system may use an indication of the door bell ringing as data the system can use to respond to the user's utterance. Many such examples are envisioned by this system.

Figure 4:
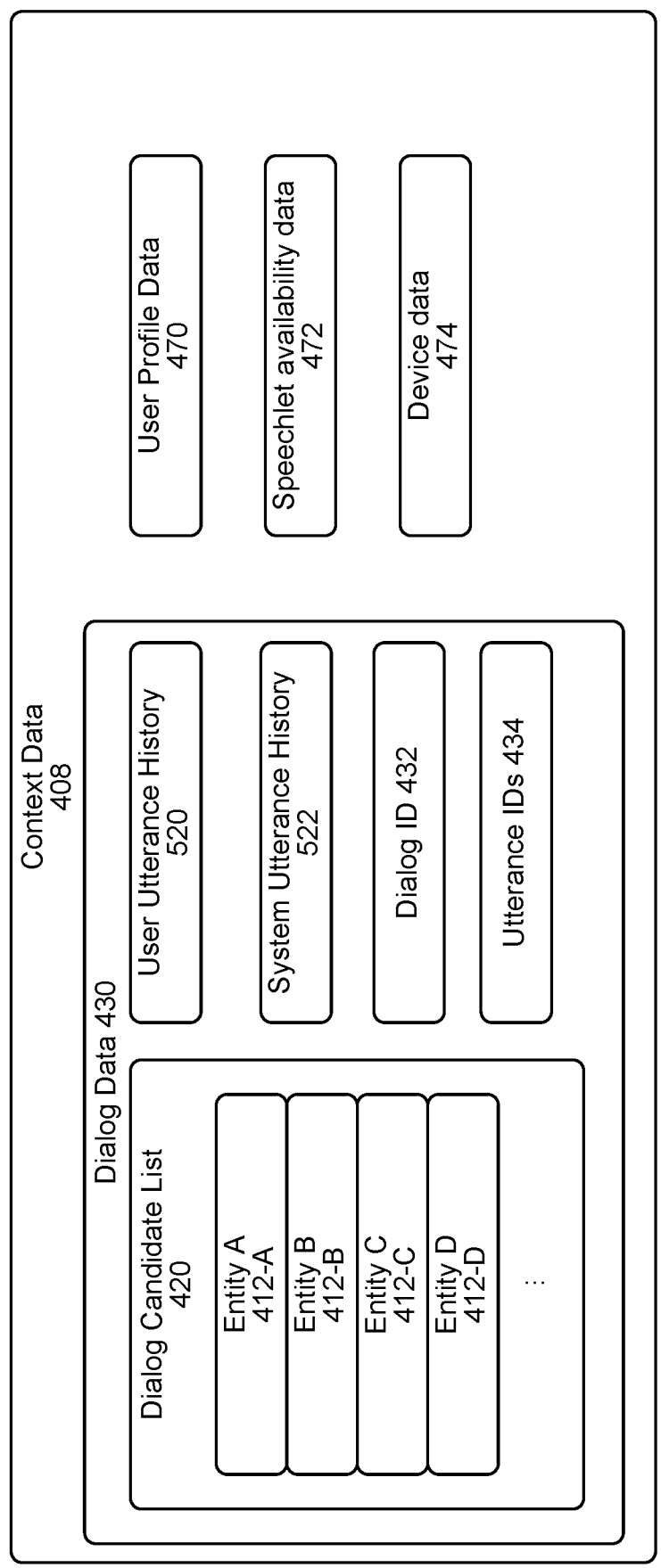
FIG. 4 illustrates dialog context data which may be stored by the system according to embodiments of the present disclosure.

Although not explicitly illustrated in FIG. 4, a variety of metadata may be stored in relation to items of context data 408. For example, an item of context data 408 may be associated with a time stamp or other indicator of when an event represented in the context data occurred, became relevant, etc. Other metadata may also be stored.

Data stored as context data 408 (such as data within the dialog candidate list 420) may be associated with a decay function, where data may be weighted based on its age, or even deleted when it becomes stale. For example, if a particular entity 412 has not been mentioned in a certain number of threshold user turns, it may be removed from the dialog candidate list 420. Further, if certain events or data stored as context data 408 reach a certain age (e.g., happened after some period of time), they may be removed or weighted lower when the system is making processing decisions.

The dialog data 430 may also include utterance history data corresponding to the dialog. For example, the text corresponding to inputs (e.g., utterances, text inputs, etc.) that were sent to the system (e.g., by a user during a dialog) may be stored as user utterance history 520. Text corresponding to responses by the system to an utterance (which may include content that was output to the user or data used to respond to the utterance, which may have been received from one or more speechlet components 290/125) may be stored as system utterance history 522. As noted below, this data may be used during the statistical analysis of determining the relevance of a particular entity 412 to a particular slot.

The context data 408 may also include other context data not explicitly recited herein.

Figure 5:
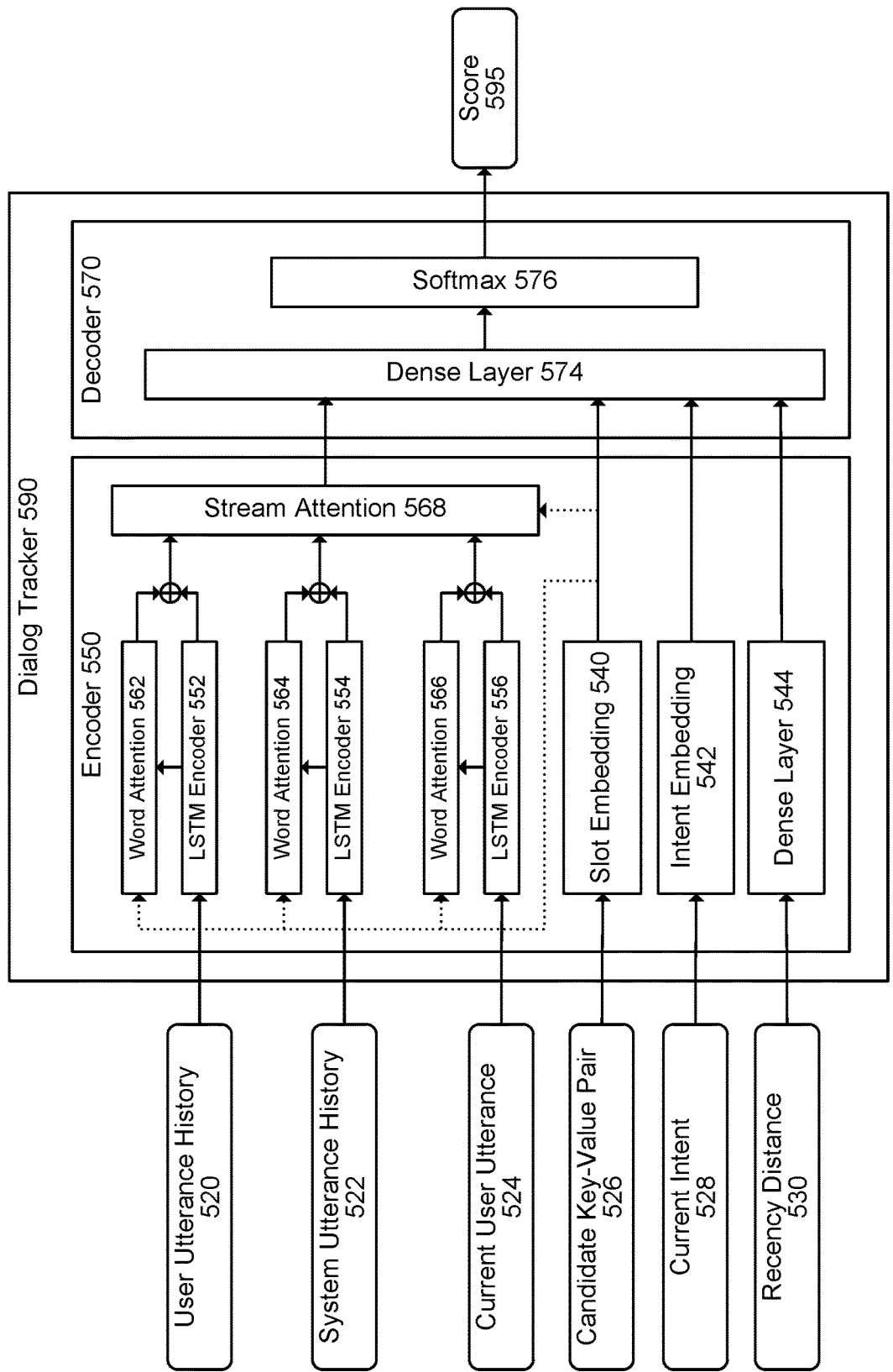
FIG. 5 illustrates components for scoring an entity pair for a slot according to embodiments of the present disclosure.

To track a dialog state as relevant to slot filling, a component such as a dialog tracker 590, as shown in FIG. 5, may be used. The dialog tracker 590 may be included as part of an orchestrator 230, context aggregator component, or other component of the system. A dialog tracker 590 performs contextual carryover of entities between conversation turns in a dialog session. It uses the dialog context data to determine, through statistical analysis, which slots/entities from a previous utterance may be relevant to slots of a current utterance. Slots/entities from a previous utterance may be used to execute an intent of a current utterance if they have a certain score as determined by the dialog tracker 590. The dialog tracker 590 may obviate the explicit resolution of certain anaphoric references.

Thus, the dialog tracker 590 offers a new approach for tracking the user's dialog goal across multiple turns (potentially spanning multiple domains) in a user-system (e.g., user-speechlet) interaction. It uses the context data 408 of multiple utterances a user speaks in succession and determines which slots/entities need to be carried over (e.g., used to fill a slot) of another utterance in a dialog. Slots/entities are carried over when the agent needs to keep the context of previous utterances and the knowledge results as part of the overall interpretation of the session, with regards to the user's goal. It may typically be used for browsing and filtering scenarios (e.g., movie/business search) and contextual Q&A, where slots/entities are used for query building (for knowledge fetch) to the backend knowledge sources.

As shown in FIG. 5, the dialog tracker 590 may use a variety of data to determine a score 595, where the score 595 corresponds to whether a particular candidate value pair 526 corresponds to slot data needed to execute an intent of a current utterance (e.g., current intent 528). The current utterance may be part of a dialog of multiple turns, where each utterance and system response may be considered a turn.

Data for a dialog turn t may be represented by a tuple $\{a_t, S_t, w_t\}$ where $w_t \in W$ is a sequence of words $\{w_{it}\}_{i=1}^{N_t}$ for the particular turn and W is a corpus of words, $a_t \in A$ is the action (e.g., intent) to be performed for the turn and A is a catalog of actions/intents and $S_t$ is a set of slots associated with the dialog (e.g., slots in dialog candidate list 420) where each slot s is a key value pair s={k,v} with k∈K being the slot category name (or slot key) and v ∈ V being the slot value. $u_t = \{a_t^u, S_t^u, w_t^u\}$ represents a user-initiated turn (e.g., a spoken utterance or other input) and $v_t = \{a_t^v, S_t^v, w_t^v\}$ represents a system-initiated turn (e.g., data obtained in response to a user utterance or input). A sequence of D user turns that occurred prior to dialog turn t may be represented as $\{u_{t-D+1}, \ldots, u_{t-2}, u_{t-1}\}$ with their associated system turns represented as $\{v_{t-D+1}, \ldots, v_{t-2}, v_{t-1}\}$. Given the sequence of previous user turns, system turns, and the current user turn $u_t$, the dialog tracker 590 may attempt to score each of the candidate entities (e.g., entities 412) in C(S) (e.g., entities that resulted from previous dialog turns both user turns (u) and system turns (v) as well as the current user turn) as follows:

$$C(S) = \bigcup_{i \in u, v, j=t-D+1}^{t-1} S_j^i$$

If the score exceeds a threshold, the system may determine to use the particular key-value pair for the slot data of the particular intent. Thus, a candidate slots E C (S) may be used for turn $u_t$, if it's score exceeds a threshold, that is if $P(+1|s, u_t, u_{t-D+1}^{t-1}, v_{t-D+1}^{t-1}) > \tau$ where $\tau$ is a decision threshold that is configurable and may be optimized by the system.

Figure 6:
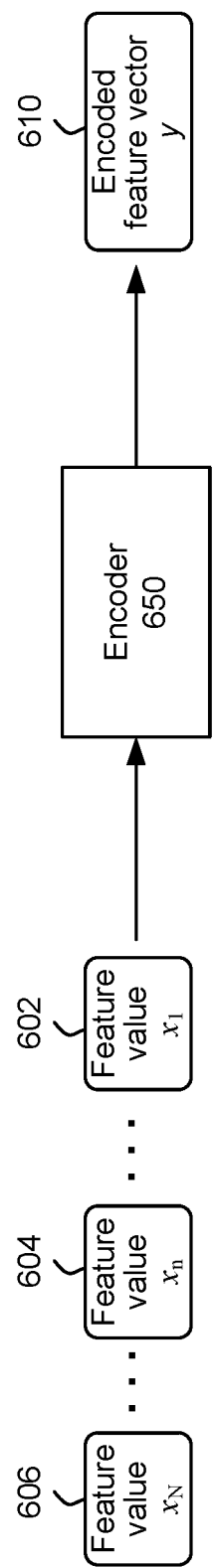
FIG. 6 illustrates operation of an encoder according to embodiments of the present disclosure.

The dialog tracker 590 may use an encoder/decoder construction as shown in FIG. 5. To accomplish vector representations of various words, word strings, etc., the system may determine an encoded vector describing various properties of how the word, word string, etc. is used. In mathematical notation, given a sequence of feature data values $x_1, \ldots x_n, \ldots x_N$, with $x_n$ being a D-dimensional vector, an encoder $E(x_1, \ldots x_N) = y$ projects the feature sequence to y, with y being a F-dimensional vector. F is a fixed length of the vector and is configurable depending on user of the encoded vector and other system configurations. For example, F may be between 100 and 1000 values for use in speech processing, but any size may be used. For example, as shown in FIG. 6, feature values 602 through 606 may be input into an encoder 650 which will output an encoded feature vector 610 that represents the input feature values. Any particular encoder 650 will be configured to output vectors of the same size, thus ensuring a continuity of output encoded vector size from any particular encoder 650 (though different encoders may output vectors different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder E may be implemented as a neural network (NN), recurrent neural network (RNN), or other model. There are a variety of ways for the encoder 650 to consume the encoder input, including but not limited to:

linear, one direction (forward or backward),
  bi-linear, essentially the concatenation of a forward and a backward embedding, or
  tree, based on parse-tree of the sequence, In addition, an attention model can be used, which is another RNN or DNN that learns to "attract" attention to certain parts of the input. The attention model can be used in combination with the above methods of consuming the input.

FIG. 6 illustrates operation of the encoder 650. The input feature value sequence, starting with feature value $x_1$ 602, continuing through feature value $x_n$ 604 and concluding with feature value $x_N$ 606 is input into the encoder 650. The encoder 650 may process the input feature values as noted above. The encoder 650 outputs the encoded feature vector y 610, which is a fixed length feature vector of length F.

As can be appreciated, many different characteristics of different values (such as utterance text, dialog history, intent data, entity data, etc.) may be represented in this manner. Many different types of feature data may be considered by the server. One example of a characteristic is a word embedding. A word embedding is a representation of how a word (or string of words) is typically used in language, as may be represented by how a word is used in the example text corpus (i.e., collection of text) or plurality of text corpuses. Such word embedding data may enable the system to determine synonyms of words or otherwise rearrange words when processing/answering an incoming question. To determine a word embedding or word usage data, using the data from one or more data sources 180, the system may analyze individual words and their respective usages. The usage characteristics for a particular word may be specific to a single data source or may represent usage of the word as it appears over multiple data sources. Usage characteristics corresponding to a word may be tracked and represented in a number of different ways. One way of representing word usage characteristics is with a data vector, where the data vector (such as encoded feature vector y 610) includes a number of characteristics representing how the word issued. For example, the vector may include characteristics indicating how often another word is used next to the subject word, how often the other word is used two words away from the subject word, etc. As can be appreciated, such vectors may become large, with thousands of characteristics resulting in thousands of data values (called dimensions) for each vector. The particular size of the vector may be configurable depending on the characteristics the system will evaluate when considering the usage of any particular word. Further, even with very large vectors, only certain dimensions of each vector may be evaluated when considering the usage of any particular word. With vectors available for each word of interest to the system (for example, all or some portion of the words in a data sources, ASR lexicon, or the like) the usage characteristics (e.g., usage vectors) may be compared against each other to determine which usage characteristics/vectors are similar. Similar word usage characteristics/vectors may indicate similar usages between individual words.

The system may then map multiple vectors, each corresponding to the usage of a particular word, into a vector space. Given the number of dimensions for each vector, the vector space may be a high dimensional vector space. A number of known techniques for manipulating vectors in high dimensional (or other) vector space may be used to compare analyze vectors and compare vectors to each other. One example for representing and analyzing word usage characteristic as vectors is the GloVe: Global Vectors for Word Representation project by Jeffery Pennington, Richard Socher, and Christopher D. Manning of the Computer Science Department of Stanford University published in 2014, though other techniques may be used. Further, vectors are one example of tracking and comparing word usage characteristics, other techniques may be used.

Figure 7:
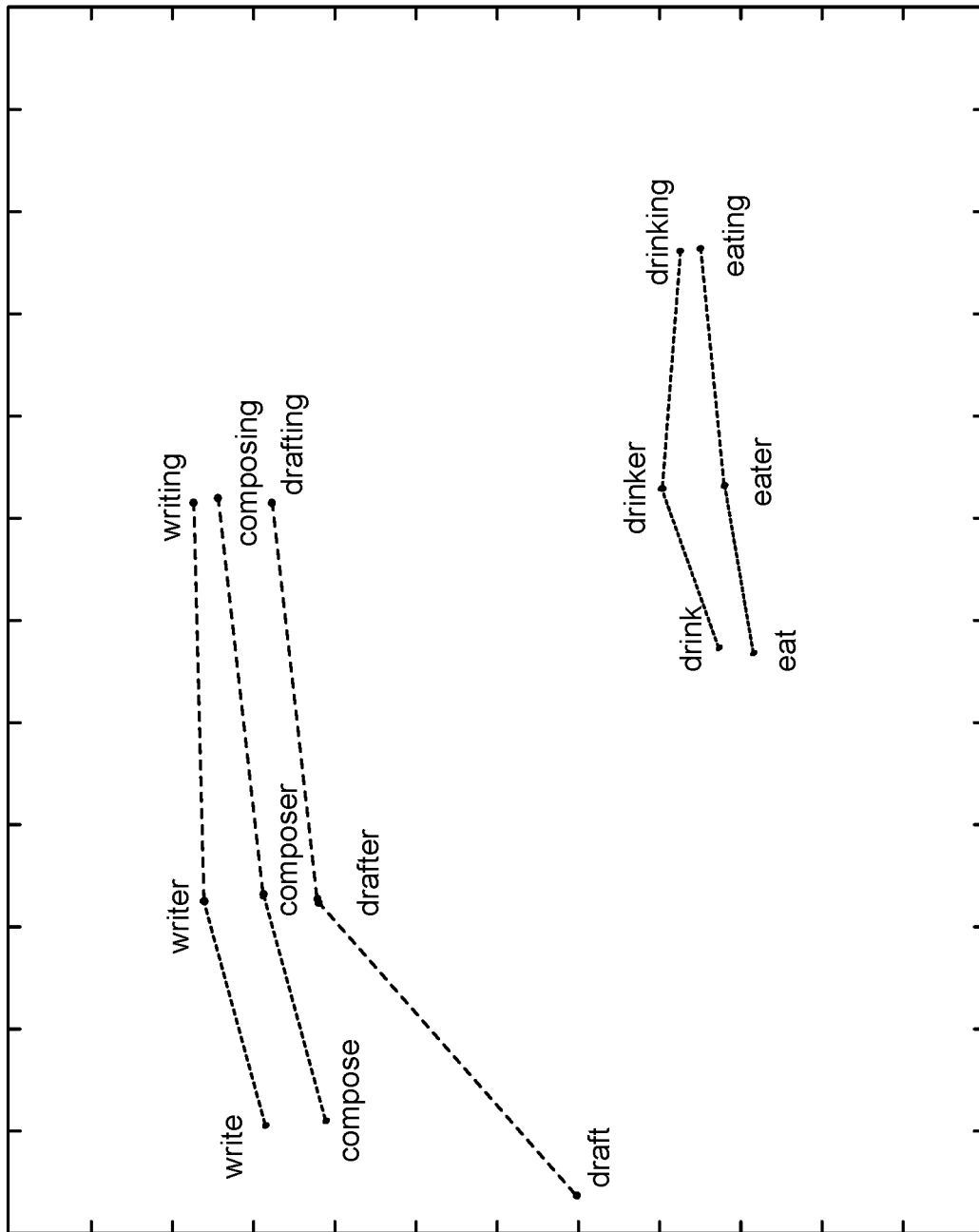
FIG. 7 illustrates representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 7 illustrates a number of words in a hypothetical vector space where each point represents the vector location for the particular word. Although illustrated as located in a two-dimensional graph for discussion purposes, the usage vectors for the words illustrated in FIG. 7 would be in a high dimensional space. Further, FIG. 7 is shown for example purposes only and the vector locations/relationships do not necessarily reflect a true graphing of the usage of the illustrated words.

As illustrated in FIG. 7, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 7. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Words in the bottom corner of FIG. 7 exhibit similar relationships to each other as the words discussed above. The words "drink" and "eat" have different meanings, but similar usages as illustrated. Further, the usage relationships of "drink" to "drinker" to "drinking" are similar to the relationships of "eat" to "eater" to "eating." Also, "drink" shows a similar usage to "eat," "drinker" shows a similar usage to "eater" and "drinking" shows a similar usage to "eating." As "eat," "eater," and "eating" are all variations of a first word root, and "drink," "drinker," and "drinking" are all variations of a second word root, the system may use the usage relationships of these words to create new variations of another new word that shares usage with one of the variation forms. Thus, if a new word is found that is similar in usage to "eat" and/or "drink" the system may infer that the new word may have a variation of the form "x-er" or "x-ing" where x is the root of the new word. That is, if a vector corresponding to a new word is within a threshold distance to "eat" and/or "drink" the system may determine that the new word is used similarly to "eat" and/or "drink" and may create variations for the new word based on the variations of "eat" and/or "drink." Various known techniques, such as Cosine distance, Euclidean distance, Manhattan distance or other techniques may be used for determining a difference between word usage, or word usage vectors. Known techniques such as using a Levenshtein distance may be used for determining a difference between text strings.

Returning to FIG. 5, various encoders may be used to create vector data such as vector representations (e.g., word embeddings) of different dialog data. For example, the system may embed the words w of an utterance using word embeddings $\Phi_w$, (such as those of the GloVe system) to get the sequence x, which is a sequence of word embeddings that may be fed into an LSTM encoder to encode data relevant to the turn of the dialog. For example, the embeddings $x_t^u$ for the words of a current user utterance/input 524 may be encoded by LSTM encoder 556 to create a vector representation $h_t^u$ where $h_t^u$=LSTM($x_t^u$). The words may be directly input into the encoder and/or there may be some feature extraction that occurs, in which case the features related to the words may be input into the encoder. Similarly, the embeddings for the words of previous user utterances/inputs (e.g. the user utterance history 520) $x_j^u$ may be encoded by LSTM encoder 552 to create a vector representation $h_{t-1}^u$ where $h_{t-1}^u$=LSTM($x_j^u$), t−D+1≤j<t. Similarly, the embeddings for the words of previous system responses of the dialog (e.g. the system utterance history 522) $x_j^v$ may be encoded by LSTM encoder 554 to create a vector representation $h_{t-1}^v$ where $h_{t-1}^v$=LSTM($x_j^v$), t−D+1≤j<t. The LSTM encoders 552, 554, and 556 may be the same or may be different.

The intent for a particular turn $a_t$ (e.g., current intent 528) may be encoded by intent embedding component 542 into a fixed length vector as $h_a=\phi_A(a_t)$ where $\phi_A$ represents a dictionary of intent embeddings and $h_a$ is the intent embedding. Thus $h_a$ is an embedding that represent usage of an input intent name relative to usage of other intent names.

Each candidate key-value pair slot s=(k, v) (e.g., candidate key-value pair 526) of candidate slots C(S) (e.g., the dialog candidate list 420) may be encoded by slot embedding 540 into its own fixed length vector $h_s$ (which may or may not be the same length as the vector $h_a$ resulting from the intent embedding) as a concatenation ⊕ of the slot key embedding and the slot value embedding, thus $h_s=\phi_K(k)\oplus\phi_w(v)$, where the operation ⊕ may be a bilinear pooling model, dot product or a multilayer perceptron (MLP) operation. As may be appreciated, while tracking entities across a dialog, a particular key-value pair may have originated from a different speechlet than the speechlet that a current intent 528 is intended for. For scoring purposes, the key-value pair may include the value (e.g., token or name) of the entity under consideration for the particular slot and the key for the intent to be executed (which may or may not be the key that was associated with the entity when it first was recognized in the dialog and/or place in the dialog candidate list. Thus, a key for a particular pair 412 corresponds to the current intent being processed (e.g., current intent 528) and may not necessarily correspond to a particular speechlet from which the entity originated.

For example, if the city "Seattle" is an entity 412 in the dialog candidate list 420, and it first appeared as part of the dialog in response to the output from a weather speechlet, the key associated with the entity in the dialog candidate list 420 may be <weatherlocation>. If, however, the current intent is a local search intent that uses the key <city> for its location slot, to determine a score 595 for whether the entity "Seattle" should be used for the slot <city>, the system will use the candidate key-value pair 526 of (City|Seattle).

Even if keys for different speechlets refer to the same type of entity (for example, locations), it may be prohibitive for the system to linguistically determine that certain keys may match each other or attempt to maintain a system-wide ontology/schema of all possible entity/key combinations. Instead, the system may use slot key embeddings to map the keys of the candidate slot into key schema of a current domain. The system may use pre-trained word embeddings as the source for computing slot embeddings. In this manner, the system may determine if words associated with a first category/key for a first speechlet are used in a manner similar to words associated with a second category/key for a second speechlet. Thus the system may draw a connection between the first category/key and the second category/key and may learn that values for the first category/key may be used in slots configured for the second category/key. For example, the system may learn that values of <weatherlocation> may be used similarly to values of <city> and thus may learn that values of one may be used for values of the other, thus creating an association between keys of different speechlets using a statistical approach. That association may be ultimately reflected in the score 595 given to a particular candidate key-value pair 526. The input to the encoder 550 may include a representation (either in the candidate key-value pair 526 or otherwise) of a key originally associated with the entity 412, for example the key of the originating speechlet for when the entity 412 originated in the dialog and was placed with the dialog candidate list 420.

For each slot category/key name k, the system may compute its label embedding by averaging over the $M_k$ associated slot value embeddings. For multi-word slot values, the embedding is constructed by averaging the associated word embeddings. Thus:

$$\phi_W(v) = \frac{1}{|w \in v|} \sum_{w \in v} \phi_W(w)$$

$$\phi_K(k) = \frac{1}{M_k} \sum_{i=1}^{M_k} \phi_W(v_i)$$

The system may construct the transformed candidate set as $C'(S) = \{(k', v) | (k, v) \in C(S) \& \phi_K(k) \odot \phi_K(k') > \beta\}$, where $\odot$ is the dot product and $\beta$ is a tunable threshold over the development set.

To consider how recent a particular candidate pair is to the current utterance, the system may also encode the recency of the pair relative to the current utterance. For example, the recency distance (530), which may be an integer representing how many user turns the pair is from the current utterance (e.g., the turn offset), may be encoded into as one-hot $\{0,1\}^{|d|}$ where d is the distance. The final distance encoding vector $h_d$ may be created by the dense layer 544 using an affine transform $h_d = W_d * \text{OneHot}(d_s) + b_d$ where $b_d$ is a configurable offset.

As shown in FIG. 5, the system may also use attention functions to properly weight certain values sent to the decoder 570. As shown, the system may use two levels of attention including word level attention (represented by word attention 562, word attention 564, and word attention 566) and stream attention (represented by stream attention 568). The word level attention allows the model to focus on individual mentions in the utterance that influence the slot carryover decision (e.g., score 595). The stream level attention allows the model to focus on specific streams (user and system) in the dialog depending on how important they are to the score for the current candidate key-value pair 526.

For each vector to be operated on using the attention models (e.g., $h_{t-1}^u$ output by LSTM Encoder 552 and corresponding to the user utterance history 520, $h_{t-1}^v$ output by LSTM Encoder 554 and corresponding to the system utterance history 522, and $h_t^u$ output by LSTM Encoder 556 and corresponding to the current user utterance/input 524) the system may attend over the words in that stream and compute a per-stream context vector. For example, for stream vector sequence $h_t^u$ (output by the LSTM Encoder 556) and slot embedding $h_s$ (output by the slot embedding component 540 and input into the word attention block 566), the system may compute the word level attention context vector as:

$$e_{js} = g(h_{tj}^u, h_s)$$

$$\alpha_{js} = \text{softmax}(e_{js})$$

$$c_t^u = \sum_{j=1}^{N_t} \alpha_{js} h_{tj}^u$$

where j is an index to $h_t^u$ and represents the hidden encoding of the associated input word at that position. The system may compute the importance of the word to the slot pair as the similarity defined in $e_{js}$, obtain the normalized weights $\alpha_{js}$ that are output by the word attention block 566 and then used to compute, for the current user utterance, the weighted context vector $c_t^u$ resulting from the combination of the output by the word attention block 566 and the output of the LSTM encoder 556. The system may then similarly calculate context vector $c_{t-1}^u$ corresponding to the post-attention weighted user utterance history and context vector $c_{t-1}^v$ corresponding to the post-attention weighted system utterance history.

The individual weighted context vectors c may be input into the stream attention component 568 to obtain the final context vector $h_c$. In the equations below, $c_k$ is selected from one of the context vectors described above, thus $c_k \in \{c_{t-1}^v, c_{t-1}^u, c_t^u\}$. Thus, for the stream attention component 568:

$$e_{ks} = g(c_k, h_s)$$

$$\alpha_{ks} = \text{softmax}(e_{ks})$$

$$h_c = \sum_{j=1}^{3} \alpha_{ks} c_k$$

Thus the decoder may use context vector representations that include post-attention weighted representations of, respectively, the current utterance, user utterance history and system utterance history.

In certain embodiments, however, the system may not use word attention techniques. Thus the vector representations output from each LSTM encoder may be used to construct $h_c$, in which case $h_c = h_{t,final}^u + h_{t-1,final}^v + h_{t-1,final}^u$.

The vectors from the encoders 540, 542 and 544 may be concatenated and sent to the decoder 570 to be processed by the dense layer 574 and then the softmax layer 576 to obtain the score where $$z = h_c \oplus h_a \oplus h_s \oplus h_d$$

$$\hat{y} = \text{softmax}(W_{decoder} * z + b_{decoder})$$

The factor z represents a concatenation of the vectors from the encoders and $b_{decoder}$ and $W_{decoder}$ are model parameters for the decoder 570. The output $\hat{y}$ may be the output symbols such as 0 or 1. The score (595) may be a likelihood of producing 0 or 1 and thus corresponds to the score of the particular candidate key value pair 526 that is under consideration for the particular slot needed to operate the current intent 528. Thus the system may calculate a particular score 595 for each pair 412 per lot that needs to be filled. Thus if there are six candidate key-value pairs 412 and two potential slots to be filled, the system may calculate twelve individual scores. The highest scoring key-value pair for a particular slot may be sent forward for use by the speechlet. Alternatively, more than one key-value pair for a particular slot may be sent to the speechlet to allow the speechlet to execute an intent using different combination of key-value pairs. The results of the different intent executions may be ranked by the system in order to determine which results to output to a device.

In one embodiment ŷ may include a probability distribution that the system may process (for example, into a score) in order to determine which key-value pair to carry forward for a particular slot.

Although the above description illustrates determining the score using multiple different vector representations of different data relevant to the dialog, utterance, etc., certain embodiments may omit or add different vector representations depending on system configuration. For example, the dialog tracker 590 may compute the score 595 using the decoder 570, as well as a vector representation of a current intent 528 and a vector representation candidate key value pair 526. Further, the dialog tracker 590 may compute the score 595 using the decoder 570, as well as a vector representation of a current intent 528, a vector representation candidate key-value pair 526, and a vector representation of the user utterance history 520. Many different combinations are possible and are envisioned as part of the present system.

Below is an illustration of a dialog that may use be processed using techniques described herein. For purposes of this example, the user utterances may be spoken, but the transmission of audio data and ASR processing is omitted for ease of illustration. The exchanges between the user (user turns marked with a U) and the system (system turns marked with a V) is illustrated in the table below:

| Intent | Turn | Turn Text | Selected Entity(ies) |
|---|---|---|---|
| Weather | U1 | weather in San Francisco | (Location | San Francisco) |
| Weather | V1 | weather is rainy and temperature 42 F. | (Temperature | 42 F.) |
| Local Search | U2 | any Mexican restaurants there | (City | San Francisco) (PlaceType | Mexican restaurants) |
| Local Search | V2 | la taqueria is a mile away | (PlaceName | la taqueria) |
| Local Search | U3 | how about in berkeley | (City | Berkeley) (PlaceType | Mexican restaurants) |

As shown, first, a user may start a new dialog by asking the system "what is the weather in San Francisco?" This utterance may be considered the first user turn, or U1. The system may process the utterance text using the NLU 260 to determine the current intent 528 for this turn is a <getweather> intent based on the text of the current utterance is "weather in San Francisco." (In certain embodiments certain words like "is," "the," etc. may be omitted from user inputs or system responses for ease of other system processing. The words to be omitted are configurable and my change depending on system configuration.) The NLU 260 may also determine that "San Francisco" is an entity with a key of <location> for a weather speechlet. Thus the entity San Francisco (as well as original key/category Location) may be added to the dialog candidate list 420, for example as entity A, 412-A. The system may determine that a <getweather> intent requires a <location> and may determine a score for the candidate pair A to determine if that pair should be used for the <location>. The system may process embeddings of the current utterance 524 ("weather in San Francisco"), the candidate pair 526 ((Location|San Francisco)), the current intent 528 (<getweather>), and the recency distance 530 (0, since the pair comes from the current utterance). For turn U1, the user utterance history 520 and system utterance history 522 may be blank. The system may determine a high score 595 for candidate pair 526 relative to the <location> slot and determine that the value (San Francisco) of the pair (or the entire pair) should be sent to the weather speechlet component for use as the <location>.

The weather speechlet may then return response data indicating that the weather is rainy and the temperature is 42 degrees F. This data may then be put into output form (for example using TTS processing) and output to the user. Thus, "weather is rainy and temperature 42 degrees F." may be considered the first system turn V1. The new entity 42F (and original key/category Temperature) may be added to the dialog candidate list 420, for example as entity B, 412-B.

The user may then ask the system "are there any Mexican restaurants there?" which becomes the second user utterance turn, U2. The system may process the utterance text of U2 using the NLU 260 to determine the current intent 528 for this turn is a <localsearch> intent for a search speechlet. The NLU 260 may also determine that the <localsearch> intent requires data to fill a <placetype> slot as well as data to fill a <city> slot. The NLU 260 may also determine that "Mexican restaurants" is an entity with a key of <placetype> for the search speechlet. Thus the entity Mexican restaurants (and key/category PlaceType) may be added to the dialog candidate list 420, for example as entity C, 412-C. To fill the <placetype> and <city> slots, the system may then perform the scoring as discussed in reference to FIG. 5, as further explained below.

For turn U2 the system may process embeddings of the current utterance 524 ("any Mexican restaurants there"), the current intent 528 (<localsearch>), the user utterance history (which corresponds to the text of U1) and the system utterance history (which corresponds to the text of V1). The system may then score each entity in the dialog candidate list 420 (which at this turn holds three entities) for each of the two slots that need to be filled (e.g., <placetype> and <city>) for the current intent. Thus potentially resulting in six total scored candidate pairs. For entity 412-A (San Francisco), the recency distance 530 is 1, since that entity came from the most recent previous user utterance. The candidate pairs 526 including entity 412-A (e.g., (PlaceType San Francisco) and (City|San Francisco)) should receive a low score for the <placetype> slot key pair but a high score for the <city> slot key pair. For entity 412-B (42F), the recency distance 530 is 1, since that entity came from the response to the most recent previous user utterance. (Recency distance may also be measured in half-steps or using some other technique.) The candidate pairs 526 including entity 412-B (PlaceType|42F) and (City|42F)) should receive low scores for both the <placetype> slot key pair and the <city> slot key pair. For entity 412-C (Mexican restaurants), the recency distance 530 is 0 (since it was received as part of the current utterance). The candidate pairs 526 including entity 412-C (PlaceType|Mexican Restaurants) and (City|Mexican Restaurants)) should receive a high score for the <placetype> slot key pair but a low score for the <city> slot key pair. Thus, the system should select the entity (San Francisco) for the <city> slot and the entity (Mexican restaurants) for the <placetype> slot and should send data for those entities (and their selected slots) to the search speechlet for execution of the <localsearch> intent. (Note that in certain embodiments of the system, candidate-pairs that are unlikely to be appropriate may be filtered out prior to scoring by the dialog tracker 590. For example, a filter or other component may determine an entity 42F with an original category Temperature should not be scored for a slot key of Location as that entity is highly unlikely to correspond to that slot key.)

The search speechlet may return text of "La Taqueria is a mile away," thus resulting in that text being included in the system utterance history as V2 as well as the addition of (La Taqueria) (and original key/category PlaceName) as entity 412-D on the dialog candidate list 420.

If the user's next utterance is "how about in Berkeley," the system will add that text as the current user utterance U3, add the text of U2 to the user utterance history, determine U3 corresponds to a current intent 528 of <localsearch>, and will add (Berkeley) as entity 412-E (and original key/category City) on the dialog candidate list 420. As the current intent requires data for two slots, <placetype> and <city>, the system may then determine a score for each of the entities 412-A through 412-E respectively for each slot type using the techniques described above. The system may then determine a highest score for candidate pair ((City|Berkeley)) for <city> and candidate pair ((PlaceType|Mexican restaurants)) for <placetype>.

One or more models implemented by components of the orchestrator component 230, dialog tracker 590, or other component may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. The models described herein, for example those used in the dialog tracker 590, may be trained using one or more large data corpuses, thus configuring the trained models to perform as desired based on the training.

Further, the above statistical approach to scoring and slot filling, such as that described above with regard to FIG. 5 and related architecture and techniques, may be implemented using speech/language processing systems across many different languages. Because the techniques are statistically based rather than expressly linguistic, ensuring proper training, embedding corpuses, etc. will allow the above techniques to be used in speech/language processing systems across many different languages.

Figure 8:
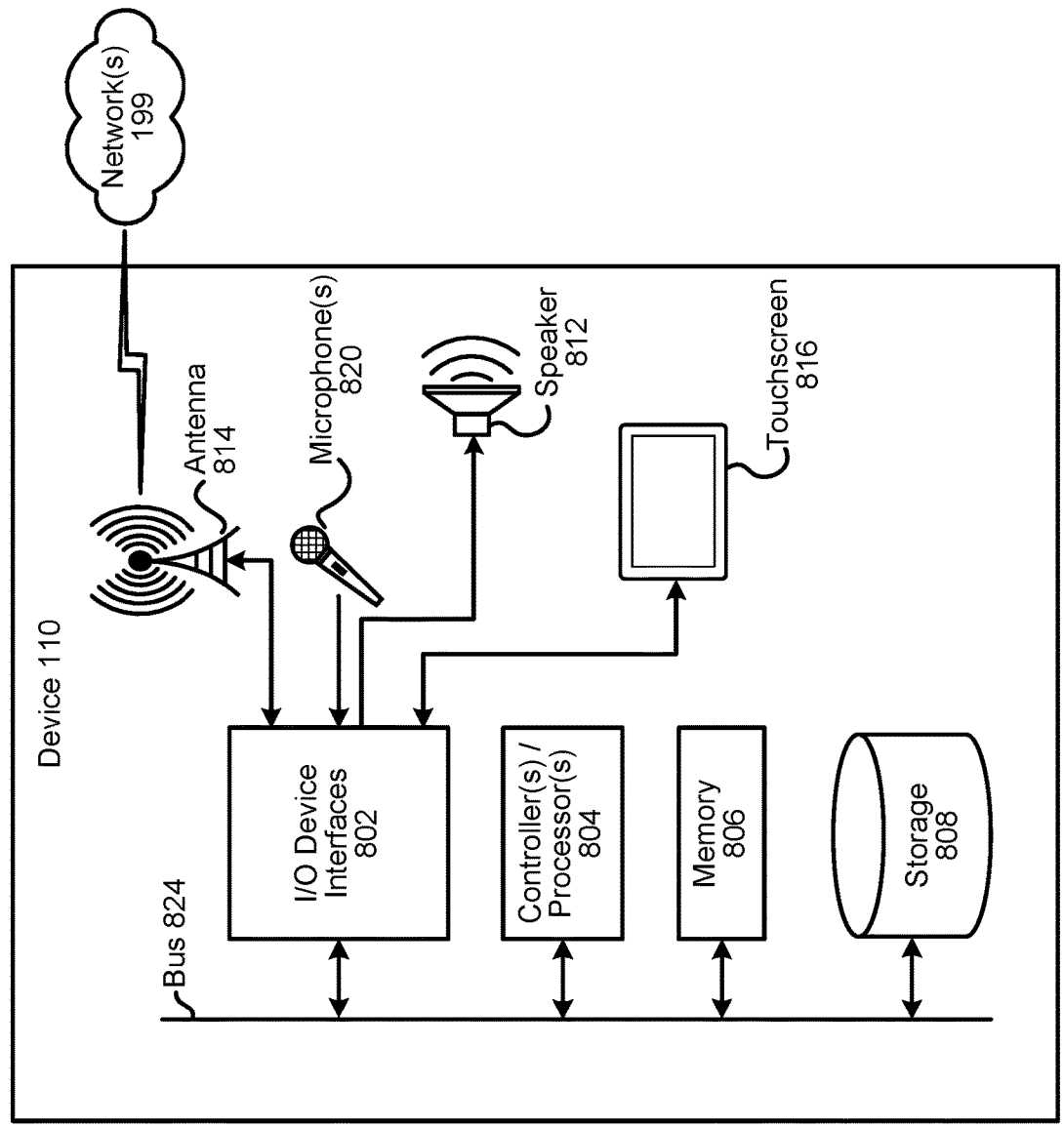
FIG. 8 is a block diagram conceptually illustrating example components of a device according to embodiments of the present disclosure.
Figure 9:
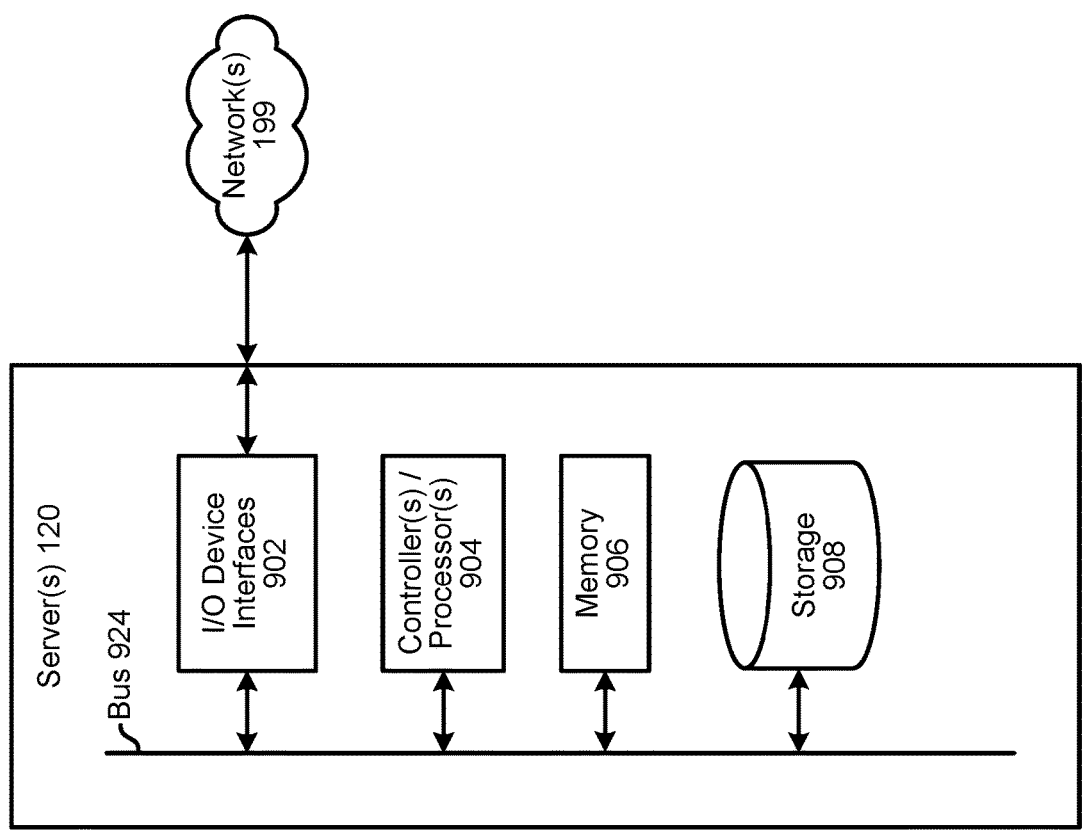
FIG. 9 is a block diagram conceptually illustrating example components of a server according to embodiments of the present disclosure.

FIG. 8 is a block diagram conceptually illustrating a user device 110 that may be used with the system. FIG. 9 is a block diagram conceptually illustrating example components of a remote device, such as the server(s) 120, which may assist with ASR processing, NLU processing, or command processing. Multiple servers 120 may be included in the system, such as one or more servers 120 for performing ASR, one or more servers 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120) may also include a data storage component (808/908) for storing data and controller/processor-executable instructions. Each data storage component (808/908) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (802/902).

Computer instructions for operating each device (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (802/902) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (802/902), processor(s) (804/904), memory (806/906), and/or storage (808/908) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

As illustrated in FIG. 10, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-capture device 110a, a smart TV 110b, a smart watch 110c, a tablet computer 110d, a vehicle 110e, a speech-capture and display device 110f, and/or a smart phone 110g may be connected to the network(s) 199 through a wireless service provider, over a WiFi or cellular network connection, or the like. Other devices are included as network-connected support devices, such as the server(s) 120, speechlet server(s) 125, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   determining first text data corresponding to a first utterance of a dialog;
   processing the first text data to determine a first intent;
   receiving first entity data including an entity name and a first category name corresponding to the entity name, the first category name corresponding to a first speechlet component configured to process the first intent;

determining second text data corresponding to a second utterance of the dialog;

processing the second text data to determine a second intent;

determining a second category name corresponding to data necessary for a second speechlet component to process the second intent;

processing at least a portion of the first text data using a first encoder to determine a first data vector;

processing the entity name and the second category name using a second encoder to determine a second data vector;

processing a second intent name using a third encoder to determine a third data vector, the second intent name corresponding to the second intent;

determining a first score using at least the first data vector, the second data vector, the third data vector and a trained decoder, wherein the first score corresponds to a relevance of the first entity data to the data necessary for execution of the second intent;

determining the first score is above a threshold;

sending, to the second speechlet component, an instruction to process the second intent using the entity name for the data necessary for the second speechlet component to process the second intent;

receiving output data from the second speechlet component; and causing an output using the output data.

2. The computer-implemented method of claim 1, further comprising:

receiving from the first speechlet component, second text data responsive to the first utterance, the second text data including the entity name; and processing the second text data using a fourth encoder to determine a fourth data vector, wherein determining the first score further comprises processing the fourth data vector using the trained decoder.

3. The computer-implemented method of claim 1, further comprising:

receiving, from the first speechlet component, second entity data including a second entity name and a third category name corresponding to the second entity name, the third category name corresponding to the first speechlet component;

processing the second entity name and the second category name using the second encoder to determine a fourth data vector;

determining a second score using at least the first data vector, the third data vector, the fourth data vector and the trained decoder, wherein the second score corresponds to a relevance of the second entity data to the data necessary for the second speechlet component; and determining that the first score is greater than the second score.

4. The computer-implemented method of claim 1, wherein the third encoder is configured to output data corresponding to usage of an input intent name relative to usage of intent names.

5. A computer-implemented method, comprising:

receiving text data corresponding to an utterance spoken during a dialog between a user and a computing system;

determining a first indication of an intent associated with the text data;

determining a first vector representation of the first indication;

determining a second vector representation of a second indication of a first entity corresponding to at least one previous utterance;

determining a third vector representation of a third indication of a second entity;

determining a first score using at least the first vector representation, the second vector representation, and a trained model, wherein the first score indicates a relevance of the second indication to the intent;

determining a second score using at least the first vector representation, the third vector representation, and the trained model, wherein the second score indicates a relevance of the third indication to the intent;

determining, based at least in part on the first score and the second score, that the intent is to be processed using an indication of the first entity; and sending an instruction to process the intent using the indication of the first entity.

6. The computer-implemented method of claim 5, further comprising:

determining a fourth vector representation of the text data, wherein determining the first score further comprises processing the fourth vector representation using the trained model.

7. The computer-implemented method of claim 5, further comprising:

determining a fourth vector representation of second text data, the second text data corresponding to the at least one previous utterance, wherein:

determining the first score further comprises processing the fourth vector representation using the trained model, and the at least one previous utterance corresponds to at least one of:
 a same dialog as the utterance,
 a same user profile as the utterance, or
 a same device as the utterance.

8. The computer-implemented method of claim 5, further comprising:

determining a fourth vector representation of data corresponding to at least one system response to the at least one previous utterance, wherein determining the first score further comprises processing the fourth vector representation using the trained model.

9. The computer-implemented method of claim 5, further comprising:

determining a number of inputs received between the utterance and a first previous utterance of the at least one previous utterance, the first previous utterance corresponding to the first entity; and determining a fourth vector representation of the number of inputs, wherein determining the first score further comprises processing the fourth vector representation using the trained model.

10. The computer-implemented method of claim 5, wherein the second indication comprises a category name corresponding to the first entity.

11. The computer-implemented method of claim 10, wherein:

the category name corresponds to a speechlet selected in response to a first utterance of the at least one previous utterance.

12. The computer-implemented method of claim 5, wherein the first vector representation corresponds to a word embedding of the first indication.

13. The computer-implemented method of claim 5, further comprising:
   determining that execution of the intent requires first entity data; and
   determining that the first entity data is not included in the text data.

14. The computer-implemented method of claim 5, further comprising:
   determining a plurality of entities corresponding to at least one of the at least one previous utterance or at least one system response to the at least one previous utterance, the plurality of entities including the first entity;
   storing an association between the first entity and a category name of the first entity, the category name corresponding to a speechlet selected in response to a first utterance of the at least one previous utterance;
   creating the second vector representation using at least the category name; and
   storing the second vector representation,
   wherein determining the second vector representation comprises accessing the second vector representation from a storage.

15. The computer-implemented method of claim 5, wherein determining the first indication comprises performing natural language understanding (NLU) processing using the text data to determine the first indication.

16. The computer-implemented method of claim 5, wherein determining the first vector representation comprises processing the first indication using an encoder to determine the first vector representation.

17. A system comprising:
   at least one processor; and
   at least one memory including instructions that, when executed by the at least one processor, cause the system to:
   receive text data corresponding to an utterance spoken during a dialog between a user and the system;
   determine a first indication of an intent associated with the text data;
   determine a first vector representation of the first indication;
   determine a second vector representation of a second indication of a first entity corresponding to at least one previous utterance;
   determine a third vector representation of a third indication of a second entity;
   determine a first score using at least the first vector representation, the second vector representation, and a trained model, wherein the first score indicates a relevance of the second indication to the intent;
   determine a second score using at least the first vector representation, the third vector representation, and the trained model, wherein the second score indicates a relevance of the third indication to the intent;
   determine, based at least in part on the first score and the second score, that the intent is to be processed using an indication of the first entity; and
   send an instruction to process the intent using the indication of the first entity.

18. The system of claim 17, wherein the at least one memory includes further instructions that, when executed by the at least one processor, further cause the system to:
   determine a fourth vector representation of the text data, wherein the instructions to determine the first score further comprise instructions to process the fourth vector representation using the trained model.

19. The system of claim 17, wherein the at least one memory includes further instructions that, when executed by the at least one processor, further cause the system to:
   determine a fourth vector representation of second text data, the second text data corresponding to the at least one previous utterance, wherein:
   the instructions to determine the first score further comprise instructions to process the fourth vector representation using the trained model, and
   the at least one previous utterance corresponds to at least one of:
      a same dialog as the utterance,
      a same user profile as the utterance, or
      a same device as the utterance.

20. The system of claim 17, wherein the at least one memory includes further instructions that, when executed by the at least one processor, further cause the system to:
   determine a fourth vector representation of data corresponding to at least one system response to the at least one previous utterance,
   wherein the instructions to determine the first score further comprise instructions to process the fourth vector representation using the trained model.

21. The system of claim 17, wherein the first vector representation corresponds to a word embedding of the first indication.

22. The system of claim 17, wherein the at least one memory includes further instructions that, when executed by the at least one processor, further cause the system to:
   determine that execution of the intent requires first entity data; and
   determine that the first entity data is not included in the text data.

* * * * *